United States Patent [19]

Haga et al.

[11] Patent Number: 5,439,070
[45] Date of Patent: Aug. 8, 1995

[54] HYDRAULIC POWER STEERING APPARATUS

[75] Inventors: Kyosuke Haga, Anjo; Mikio Suzuki, Hekinan; Yoshiharu Inaguma, Nagoya; Kenichi Fukumura; Hideya Kato, both of Aichi; Katsuhisa Mori, Okazaki, all of Japan

[73] Assignee: Toyoda Koki Kabushiki Kaisha, Kariya, Japan

[21] Appl. No.: 75,307

[22] Filed: Jun. 11, 1993

[30] Foreign Application Priority Data

Jun. 12, 1992 [JP] Japan .................. 4-179108
Jun. 15, 1992 [JP] Japan .................. 4-155251
Sep. 29, 1992 [JP] Japan .................. 4-283829
Oct. 20, 1992 [JP] Japan .................. 4-281676
Oct. 22, 1992 [JP] Japan .................. 4-284776

[51] Int. Cl.$^6$ ........................................ B62D 5/08
[52] U.S. Cl. .......................... 180/141; 180/149
[58] Field of Search ............ 180/132, 141, 142, 143, 180/149, 139, 152

[56] References Cited

U.S. PATENT DOCUMENTS 4,714,413 12/1987 Duffy .
5,048,628 9/1991 Rayner ...................... 180/141
5,070,956 12/1991 Pawlak et al. .............. 180/141
5,184,693 2/1993 Miller ........................ 180/143
5,267,628 12/1993 Tomiyoshi et al. .......... 180/141
5,279,380 1/1994 Frank et al. ................ 180/141
5,293,953 3/1994 Edahiro ....................... 180/141

FOREIGN PATENT DOCUMENTS 54-5571 3/1979 Japan .

Primary Examiner—Margaret A. Focarino
Assistant Examiner—Carla Mattix
Attorney, Agent, or Firm—Oblon, Spivak, McClelland, Maier & Neustadt

[57] ABSTRACT

A power steering apparatus having a hydraulic pump for outputting a pressurized fluid, an assist force generation mechanism hydraulically connected to the pump through a supply passage to generate an assist force in response to rotation of a steering wheel, wherein the assist force generation mechanism has a characteristic that the back pressure thereof increases when the steering wheel is rotated. The power steering apparatus further comprises a flow control valve having a spool which is moved in response to a pressure drop at a metering orifice disposed in the middle of the supply passage, so as to control the flow rate of the pressurized fluid to be constant. The spring chamber of the flow control valve is connected to a reservoir through a drain passage, and a drain valve is disposed in the drain passage for allowing the flow of pressurized fluid from the spring chamber to the reservoir when the back pressure of the assist force generation mechanism is low, and for prohibiting the flow of the pressurized fluid when the back pressure of the assist force generation mechanism increases.

10 Claims, 18 Drawing Sheets

HYDRAULIC POWER STEERING APPARATUS

BACKGROUND OF THE INVENTION

1. Field of the Invention

The present invention relates to a hydraulic power steering apparatus suitable for use in vehicles, and more particularly to a hydraulic power steering apparatus in which the flow rate of pressurized fluid supplied to an assist force generation mechanism is controlled by a flow control valve.

2. Discussion of the Prior Art

A hydraulic power steering apparatus is usually provided with a hydraulic pump and a flow control valve for supplying a pressurized fluid to an assist force generating mechanism at a constant flow rate. In such power steering system, the energy consumed by the hydraulic pump increases in accordance with an increase in the flow rate of the pressurized fluid. Therefore, the conventional hydraulic pump always consumes an amount of large energy or power.

In order to solve the above-mentioned problem, improved power steering apparatus have been proposed for reducing the flow rate of pressurized fluid during high speed traveling. Examples of such power steering apparatus are shown in Japanese Patent Publication No. 54-5571 and U.S. Pat. No. 4,714, 413. For example, in the apparatus of Japanese Patent Publication No. 54-5571, there is provided a vehicle speed sensor S, an amplifier A for amplifying a signal from the sensor S, and an electromagnetic valve SV which responds to the amplified speed signal, as shown in FIG. 1. The valve SV operates to reduce the pressure in the spring chamber of a flow control valve FC in accordance with an increase of the vehicle speed, thereby reducing the flow rate of the pressurized fluid supplied to the assist force generating mechanism which is composed of a rotary valve RV and a power cylinder PC. This system reduces the energy consumption of the hydraulic pump P. The power steering system also has a preferable characteristic that assist forces generated during high speed traveling are smaller that those during low speed traveling.

The conventional power steering apparatus, however, have a drawback that the flow rate of the pressurized fluid supplied to the assist force generating mechanism decreases when a steering wheel HD is turned. This causes a decrease of the assist force, giving a dull steering feel to a driver. Namely, when the driver steers the steering wheel, the rotary valve RV of the assist force generating mechanism operates to supply the pressurized fluid to a power cylinder PC for generating assist force, whereby the back pressure of the servo valve increases. This causes an increase of the flow rate of the fluid flowing through the electromagnetic valve SV, whereby the pressure in the spring chamber of the flow control valve FC decreases. This pressure decrease causes the flow control valve FC to increase the amount of the fluid draining to a reservoir R through a bypass passage BP, whereby the flow rate of the fluid supplied to the assist force generating mechanism is reduced.

SUMMARY OF THE INVENTION

Accordingly, it is an object of the present invention to provide an improved power steering apparatus which is capable of the increasing the flow rate of pressurized fluid supplied to an assist force generation mechanism when the back pressure of the assist force generating mechanism increases in response to a rotation of a steering wheel.

Accordingly, it is another object of the present invention to provide an improved power steering apparatus which is capable of maintaining the flow rate of pressurized fluid supplied to an assist force generating mechanism even when the back pressure of the assist force generating mechanism increases.

Briefly, the present invention relates to an improvement for a power steering apparatus having a hydraulic pump for supplying a pressurized fluid, and an assist force generation mechanism hydraulically connected to the pump through a supply passage to generate an assist force in response to rotation of a steering wheel, wherein the assist force generation mechanism has a characteristic that the back pressure thereof increases when the steering wheel is rotated. In the preferred embodiments, the assist force generation mechanism comprises a power cylinder having a piston connected to a steering linkage and received in the power cylinder to define a pair of chambers therein, and a rotary valve operable in response to rotation of the steering wheel to selectively deliver the pressurized fluid to one of the chambers while communicating the other of the chambers with a reservoir.

A power steering apparatus according to the present invention comprises a metering orifice disposed in the supply passage; a bypass passage for bypassing a part of the pressurized fluid from the supply passage to a reservoir or an intake port of the pump; and a control valve disposed in the bypass passage and having a movable spool which is urged by biassing means in a control chamber and is moved in accordance with a pressure difference across the metering orifice to control the flow rate of pressurized fluid flowing through the bypass passage whereby the flow rate of pressurized fluid supplied to said assist force generation mechanism is maintained to be constant. The apparatus further comprises a drain passage disposed between the control chamber and a low pressure portion such as reservoir, and a drain valve disposed in the drain passage for allowing the flow of pressurized fluid from the control chamber to the low pressure portion when the back pressure of the assist force generation mechanism is low, and for decreasing the flow of the pressurized fluid when the back pressure of the assist force generation mechanism increases.

With this constitution, the flow rate of the pressurized fluid supplied to the assist force generation mechanism is reduced when the steering wheel is in its neutral position and is not rotated, thereby reducing the energy loss which is produced at the assist force generation mechanism and the supply passage.

In some preferred embodiments, there is provided a variable orifice mechanism connected to the supply passage in parallel relationship with the metering orifice. The variable orifice mechanism comprises an additional orifice, and a control spool for closing the additional orifice in response to an increase of the flow rate of the pressurized fluid discharged from the pump. With this constitution, it becomes possible to change the flow rate of the pressurized fluid in accordance with the rotational speed of the pump.

In some preferred embodiments, the power steering apparatus further comprises an improved rotary valve which comprises a first control portion forming a first fluid bridge circuit having two supply paths connected to a pressurized fluid receiving port of the rotary valve and two drain paths connected to a drain port of the rotary valve, and variable orifices disposed in the four paths, respectively, so as to control the flow rate of the pressurized fluid flowing to the drain port though the first fluid bridge circuit; and a second control portion forming a second fluid bridge circuit having two supply paths for connecting the pressurized fluid receiving port and the chambers of the cylinder and two drain paths for connecting the chamber of the power cylinder and the drain port, and variable orifices disposed in the four paths, respectively, so as to control the flow rate of the pressurized fluid flowing to the chambers of the power cylinder, wherein each of the variable orifices disposed in the supply paths of the first control portion is composed of a center-open type orifice which opens when the steering wheel is located at a neutral position, and each of the variable orifices disposed in the supply paths of the second control portion is composed of a center-close type orifice which closes when the steering wheel is located at the neutral position.

Further, in some embodiments, the control chamber of the control valve is connected to the supply passage through a control orifice, and the power steering apparatus further comprises a drain control valve disposed in the drain passage at a position between the drain valve and the low pressure portion to be responsive to a pressure drop at the control orifice to reduce the flow rate of pressurized fluid flowing to the low pressure portion when the back pressure of the assist force generation mechanism increases. By employing this constitution, the reliability of the power steering is increased. Namely, when the drain valve is locked due to substances in the fluid, the drain control valve controls the flow of the pressurized fluid through the drain passage.

According to another aspect of the present invention, an electromagnetic drain valve is disposed in the drain passage, and the opening of the electromagnetic drain valve is controlled in accordance with a driving condition. A drain control valve is also disposed in the drain passage at a position between the drain valve and the low pressure portion to be responsive to a pressure drop at the control orifice to reduce the flow rate of pressurized fluid flowing to the low pressure portion when the back pressure of the assist force generation mechanism increases. This constitution realizes a flow rate control in which the flow rate of the pressurized fluid supplied to the assist force generation mechanism is controlled in accordance with the driving conditions such as vehicle speed. Further, since the flow rate of the pressurized fluid is maintained to be constant even when the assist force generation mechanism operates. This ensures the proper generation of the assist force.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

Preferred embodiments of the present invention will be now described with reference to drawings.

Figure 1:
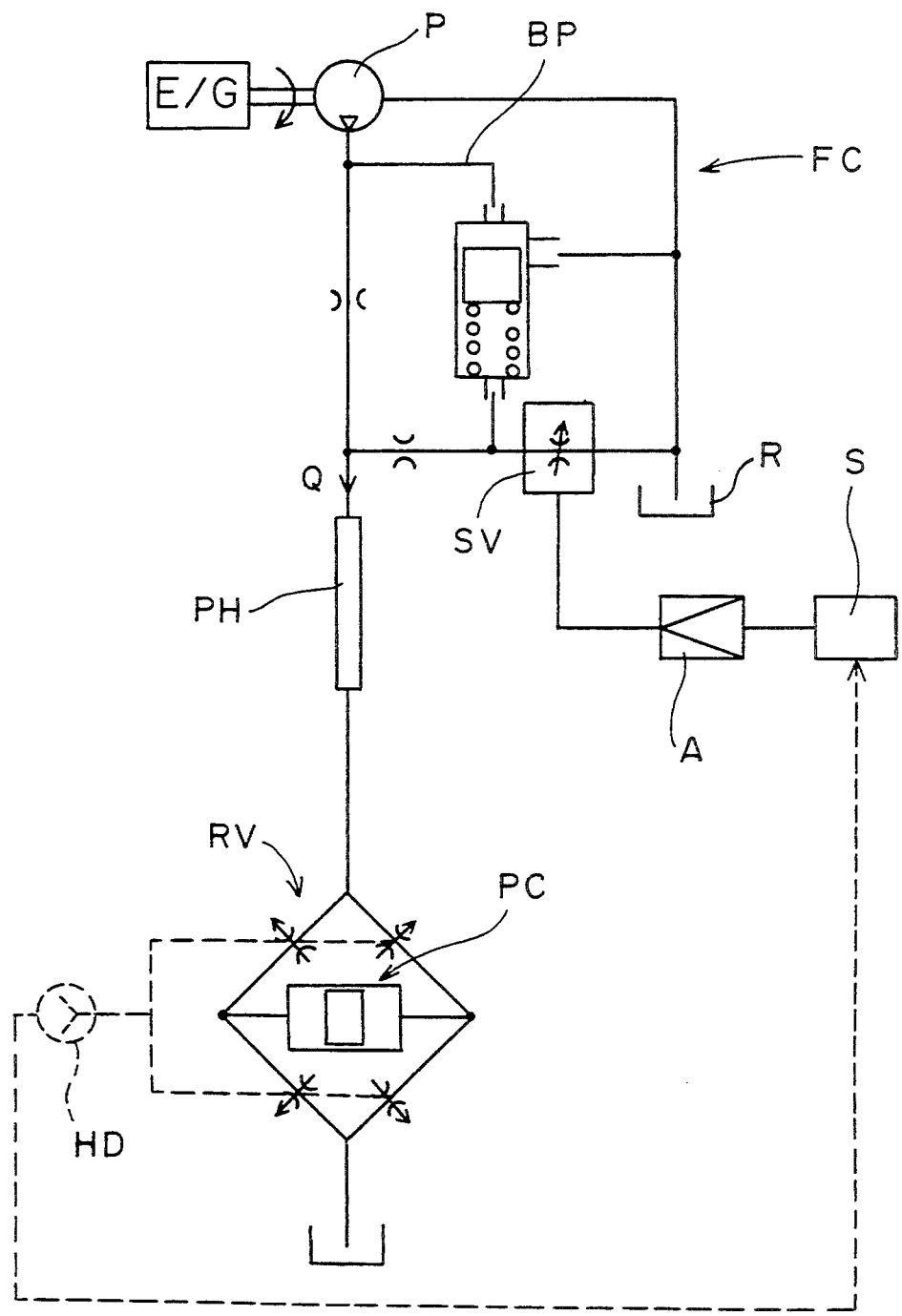
FIG. 1 is a schematic illustration showing a conventional power steering apparatus.
Figure 2:
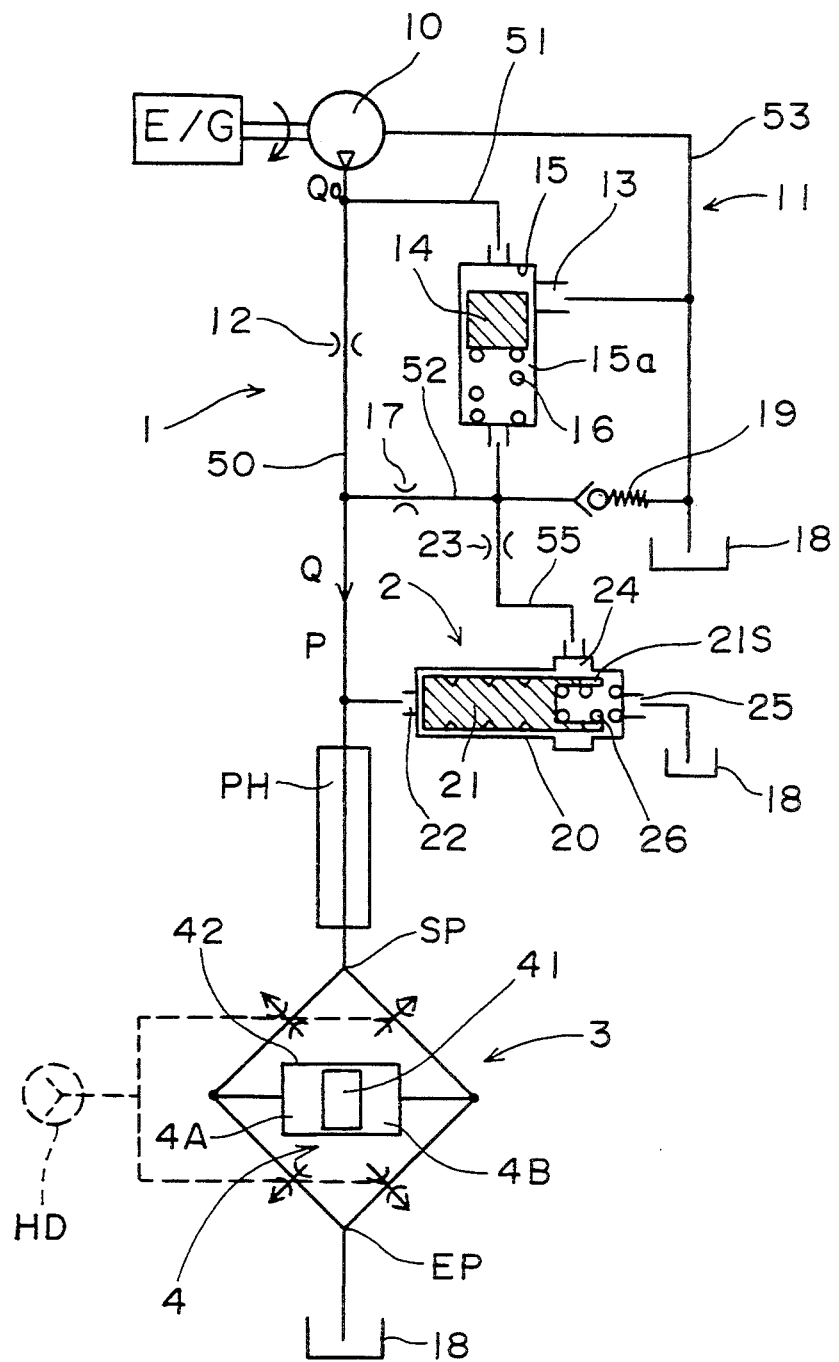
FIG. 2 is a schematic illustration showing a power steering apparatus according to a first embodiment of the present invention.

First Embodiment:

As shown in FIG. 2, a power steering apparatus according to a first embodiment of the present invention is composed of a fluid supplying section 1 for supplying a pressurized fluid at a constant rate, a drain valve section 2 for reducing the flow rate of the pressurized fluid supplied by the fluid supplying section 1 when a steering wheel HD is located at its neutral position, a power cylinder 4 composed of a piston and a housing and fluidly operable for generating assist force or assist power, and a rotary valve 3 responsive to rotation of a steering wheel HD for delivering the pressurized fluid to a selective one of the cylinder chambers of the power cylinder 4.

The fluid supplying section 1 is composed of a hydraulic pump 10 which is driven by an engine, and a flow control valve 11 for controlling the flow of the pressurized fluid output from the pump 10 so that the flow rate of the pressurized fluid becomes a predetermined rate Q. The controlled pressurized fluid is supplied to the rotary valve 3 via a supply passage 50 comprising a pressure hose PH.

The flow control valve 11 comprises a metering orifice 12 disposed in the middle of the supply passage 50. One end of a bypass passage 51 is connected to the supply passage 50 at the upstream side of the metering orifice 12, while one end of a leading passage 52 is connected to the supply passage 50 at the downstream side of the metering orifice 12. The other end of the bypass passage 51 is connected to an intake passage 53 via a control chamber 15, and the intake passage 53 is disposed between a reservoir 18 and the pump 10 for connecting them. A spool 14 is received in the control chamber 15 to define a spring chamber 15a at the back side of the spool 14 which receives a spring 16. The other end of the leading passage 52 is connected to the spring chamber 15a, and a first control orifice 17 is disposed in the middle of the leading passage 52. In such a flow control valve, a pressure in the supply passage 50 at the upstream side of the metering orifice 12 is transmitted to the control chamber 15 through the bypass passage 51 to act on a first end of the spool 14, while a pressure in the supply passage 50 at the downstream side of the metering orifice 12 is transmitted to the spring chamber 15a through the leading passage 52 to act on the second end of the spool 14. A force generated by the spring 16 also acts on the second end of the spool 14. With this configuration, the spool 14 moves to keep the pressure drop at the metering orifice 12 constant, whereby the flow rate of the pressurized fluid which flows to the intake passage 53 is changed so that the pressurized fluid is supplied to the rotary valve 3 at a predetermined constant rate. The spring chamber 15a is also connected to the reservoir 18 through a relief valve 19 which opens when the pressure in the supply passage 50 exceeds a predetermined relief pressure. This relief valve 19 prevents the pressure in the supply passage 50 from excessively increasing.

The drain valve 2 is composed of a cylinder 20, a spool 21 received in the cylinder 20 for sliding movement and a spring 26 disposed between the cylinder 20 and the spool 21. The cylinder 20 is formed at its first end with a first port 22 which is connected to the supply passage 50 at the downstream side of the metering orifice 12, and at its second end with a second port 24 connected to the spring chamber 15a of the flow control valve 11 via a second control orifice 23 and a third port 25 which is connected to the reservoir 18. The spool 21 is provided with a blind hole 21a at its one end corresponding to the second end of the cylinder 20 for receiving the spring 26 and forming a cylindrical wall portion. The cylindrical wall portion is formed with slits 21S which are located at a predetermined axial location so as to correspond to the second port 24 when the spool 21 is located at its retracted position, as shown in FIG. 2.

Figure 3:
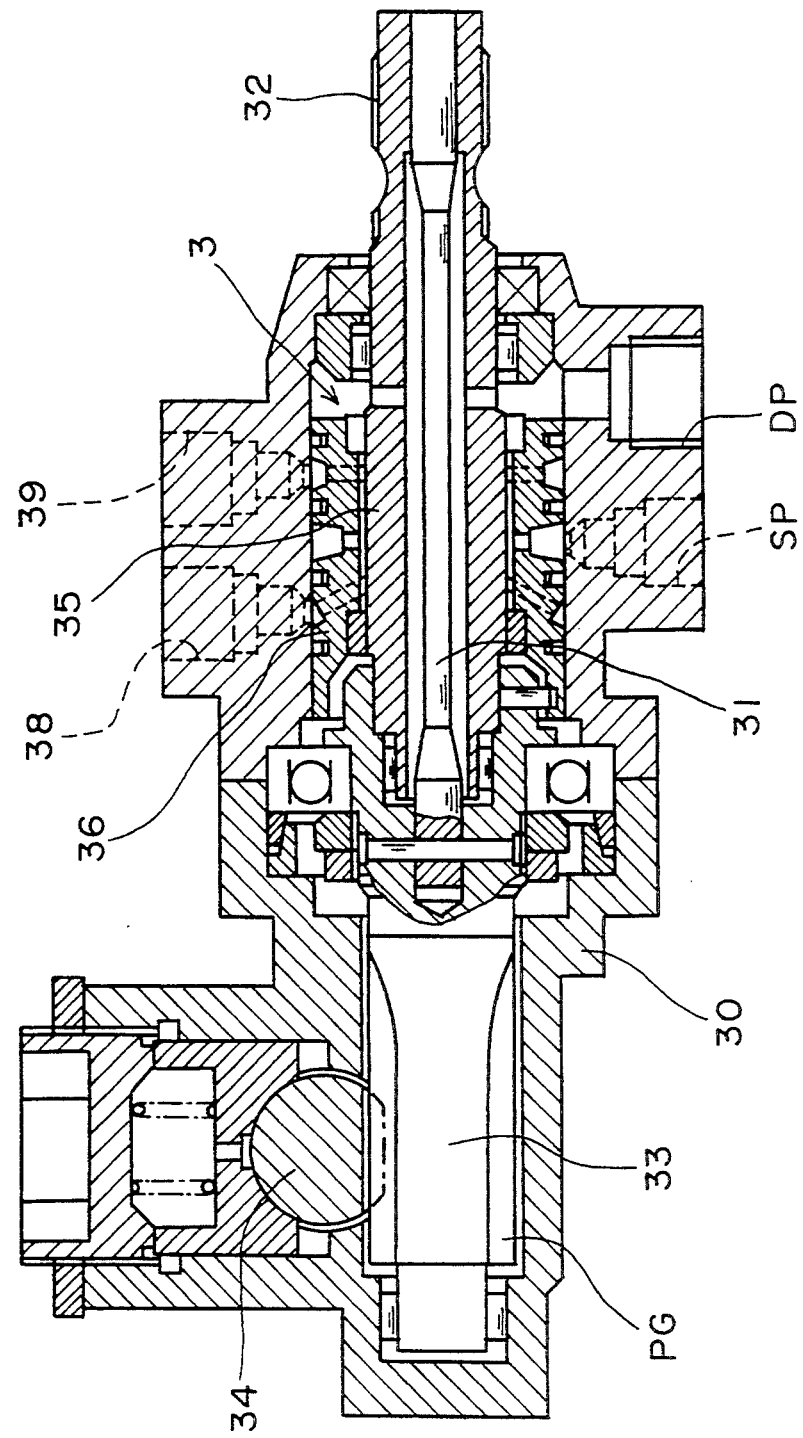
FIG. 3 is a sectional view of the rotary valve shown in FIG. 2.

Since the rotary valve 3 in this embodiment has a well known structure, the detailed explanation will be omitted. FIG. 3 shows a gear housing 30 of an assist force generation mechanism of a rack and pinion type, in which the rotary valve 3 is assembled. Namely, the rotary valve 3 comprises an inner valve member 35 integrally formed on an input shaft 32, and an outer valve member 36 arranged for relative rotation with respect to the inner valve member 35. The outer valve member 36 is mechanically connected to an output shaft 33, which is connected to the input shaft 32 through a torsion bar 31. The output shaft 33 is also connected to a rack shaft 34 through a pinion gear PG. The inner and outer valve members 35 and 36 constitute a directional control valve of a rotary type which operates in response to relative rotation between the valve members 35 and 36 to deliver the pressurized fluid received by the supply port SP to one of first and second cylinder ports 38 and 39 while communicating the other of the first and second cylinder ports 38 and 39 with a drain port DP.

The power cylinder 4 is composed of a cylinder 42 and a piston 41 received within the cylinder 42 and connected to a steering mechanism or steering linkage such as a rack shaft 34 shown in FIG. 3. The piston 41 divides the inner space of the cylinder 42 to form a pair of cylinder chambers 4A and 4B which are connected to the first and second cylinder ports 38 and 39 of the rotary valve 3. When pressurized fluid is supplied to one of the cylinder chambers 4A and 4B in response to a steering operation, the piston 41 is moved to assist the steering operation.

The operation of the power steering apparatus according to this embodiment will be now described.

When the running of the engine is started, the pump 10 discharges pressurized fluid. This pressurized fluid is supplied to the rotary valve 3 through the metering orifice 12.

Figure 4:
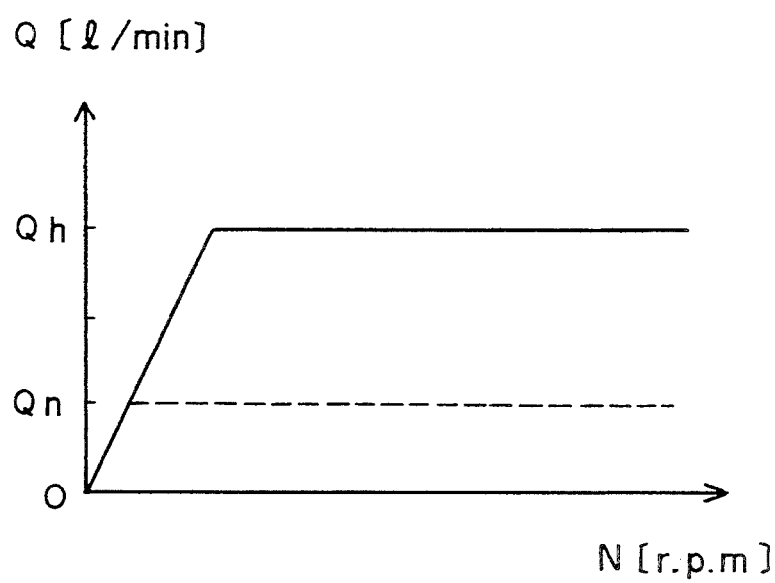
FIG. 4 is a graph showing the relationship between the running speed of an engine and the flow rate of pressurized fluid in the first embodiment.

In the event that the steering wheel HD is not steered from its neutral position, the supply port SP is communicated with the drain port DP. In such condition, the back pressure of the rotary valve 3 or the pressure in the supply passage 50 at the downstream side of the metering orifice 12 is low. Accordingly, the force acts on the spool 21 of the drain valve 2 which is produced by the fluid led to the first port 22 of the cylinder 20 is smaller than the force generated by the spring 26, whereby the spool 21 is located at its retracted position, as shown in FIG. 2. Under such state, a communication is established between the second port 24 and third port 25 through the slits 21S of the spool 21, whereby the pressurized fluid at the downstream side of the metering orifice 12 flows to the reservoir 18 through the first and second control orifices 17 and 23. Due the existence of the first control orifice 17, the pressure in the spring chamber 15a of the flow control valve 11 becomes lower than the pressure at the downstream side of the metering orifice 12. Since the pressurized fluid output from the pump 10 flows to the bypass passage 51, and a high pressure acts on the upper or first end of the spool 14, the spool 14 is moved downward, whereby the cross section of the throttle control portion 13 of the bypass passage 51 becomes large. In such condition, a large amount of the pressurized fluid flows from the supply passage 50 to the intake passage 53 through the bypass passage 51. This bypass operation decreases the flow rate of the pressurized fluid supplied to the rotary valve 3 to a predetermined rate Qn, as indicated by a broken line in FIG. 4. Under such condition, the energy consumed by the pump 10 is reduced because of the reduced flow rate.

When the steering wheel HD is rotated, the rotary valve 3 operates to deliver the pressurized fluid to the power cylinder 4. In such condition, the back pressure of the rotary valve 3, or the pressure at the downstream side of the metering orifice 12 increases. Since this increased pressure is led to the first port 22 of the drain valve 2, the spool 21 is moved in the right-hand direction as viewed in the FIG. 2 against the force of the spring 26, whereby the communication between the second port 24 and third port 25 is interrupted. With this operation, the flow through the first and second orifices 17 and 23 is stopped so that the pressure in the spring chamber 15a increases until the pressure in the spring chamber 15a becomes equal to the pressure in the supply passage 50 at the downstream side of the metering orifice 12. This causes an upward movement of the spool 14 to reduce the cross section of the throttle control portion 13 of the bypass passage 51, whereby the flow rate of the pressurized fluid supplied to the rotary valve 3 gradually increases from the rate Qn, and reaches a predetermined high flow rate Qh when the back pressure of the rotary valve 3 reaches a predetermined pressure Ps. Under such condition, the sufficient amount of pressurized fluid is supplied to the rotary valve 3 to generate assist force sufficiently.

As explained above, the flow rate of the pressurized fluid supplied to the rotary valve 3 is reduced from Qh to Qn when the steering wheel 1 is located in its neutral position. Therefore, the pressure losses generated at the pump, high pressure hose, rotary valve, power cylinder and the like are reduced during such neutral condition, resulting in a decrease in the energy consumption of the power steering system.

In the above embodiment, the drain valve 2 is provided with a spool having slits. However, a different kind of valve the spool of which may have or may not have slits can be used as the drain valve 2, provided that it has the same function.

Further, a different kind of valve such as spool valve may be used, instead of the rotary servo valve 3, as a servo valve.

Figure 6:
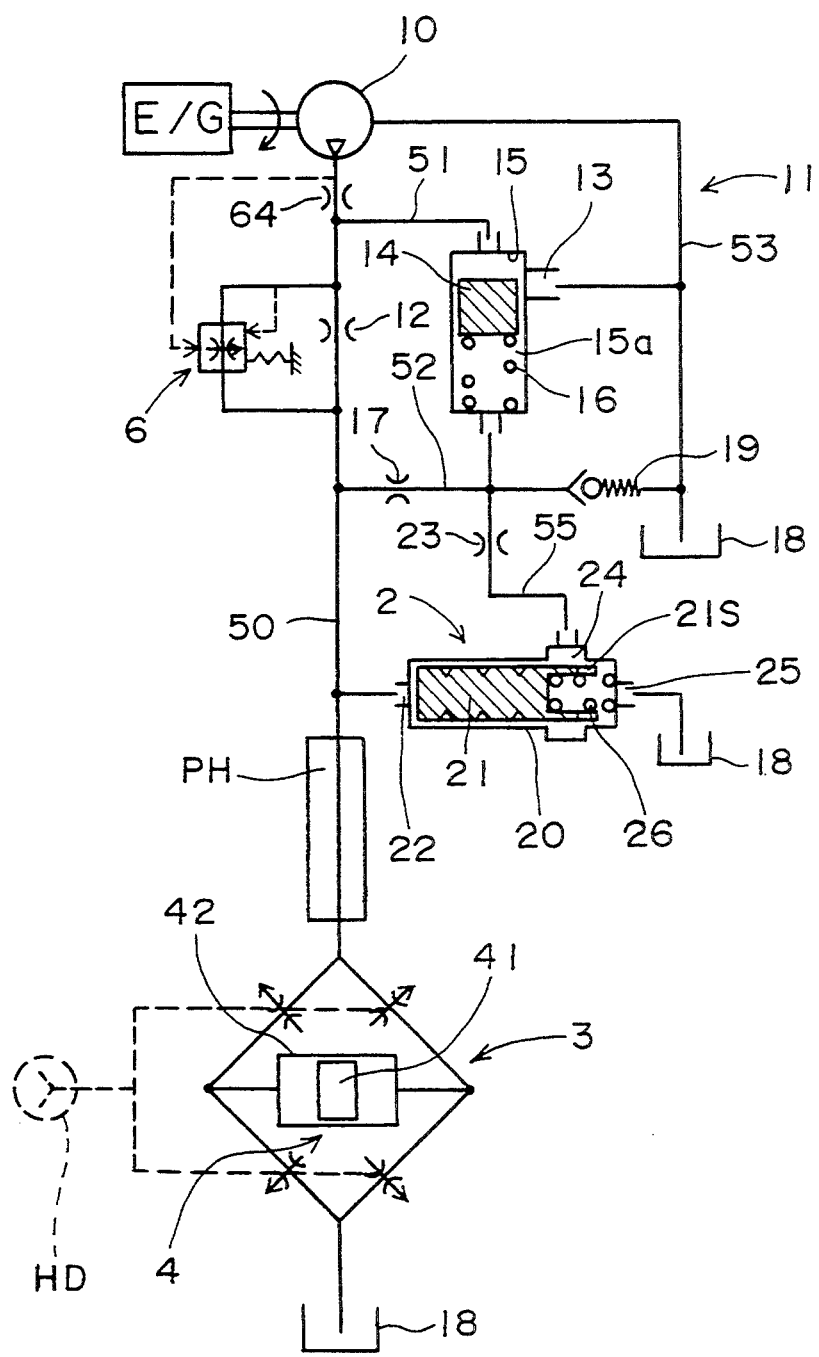
FIG. 6 is a schematic illustration showing a power steering apparatus according to a second embodiment of the present invention.
Figure 7:
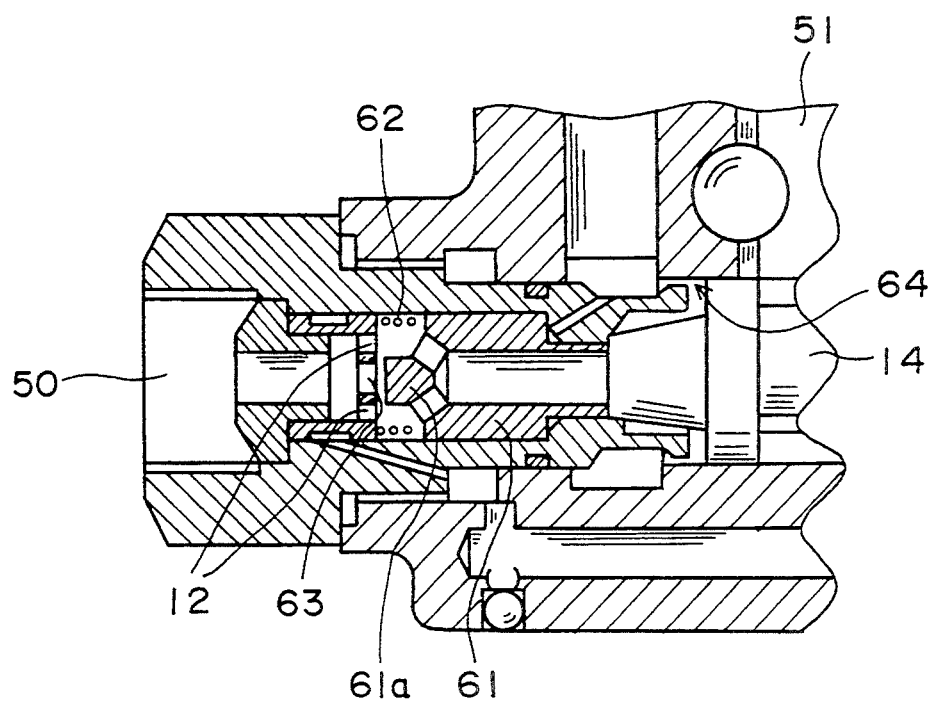
FIG. 7 is a sectional view showing the structure of a variable orifice mechanism shown in FIG. 6.

Second Embodiment:

In this embodiment, a variable orifice mechanism 6 is added to the power steering apparatus according the first embodiment, as shown in FIG. 6. The variable orifice mechanism 6 is connected to the supply passage 50 in parallel relationship with the metering orifice 12. FIG. 7 shows the structure of the variable orifice mechanism 6 which is built in the housing of the pump 10.

Since the detail structure of the variable orifice mechanism 6 is described in U.S. Pat. No. 4,361,166, only operation thereof will be described.

When the running speed of the engine (the running speed of the pump 10) is lower than a predetermined speed N1, a spool 61 is located at its retracted position as shown in FIG. 7, because a differential pressure which is generated by the additional metering orifice 64 and acts on the spool 61 is smaller than a thrust force generated by a spring 62. In such condition, the pressurized fluid output from the pump 10 flows to the supply passage 50 through the metering orifice 12 and a additional orifice 63, and the flow rate of the pressurized fluid at the time when the back pressure of the rotary valve 3 reaches a predetermined pressure Ps (hereinafter referred to as "saturated flow rate") becomes Qh.

When the running speed of the engine reaches a predetermined speed N1, a spool 61 starts to be moved in the left hand direction as view in FIG. 7 because the difference pressure acting on the spool 61 becomes larger than the thrust force generated by a spring 62. With this operation, the additional orifice 63 is gradually closed by the protruded portion 61a of the spool 61. In such condition, the pressurized fluid output from the pump 10 flows to the supply passage 50 through the metering orifice 12 and the additional orifice 63, but the opening of the additional orifice 63 gradually becomes small. Therefore, the saturated flow rate of the pressurized fluid supplied to the supply passage 50 is gradually decreased from the rate Qh.

Figure 8:
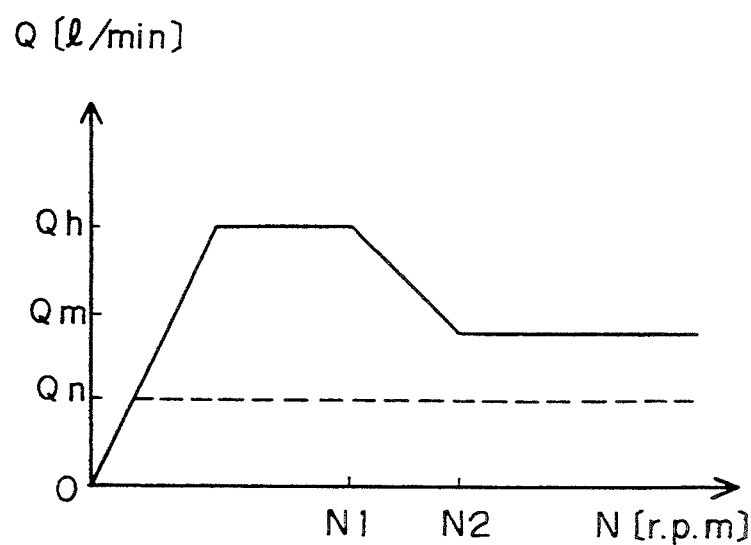
FIG. 8 is a graph showing the relationship between the running speed of an engine and the flow rate of pressurized fluid in the second embodiment.
Figure 9:
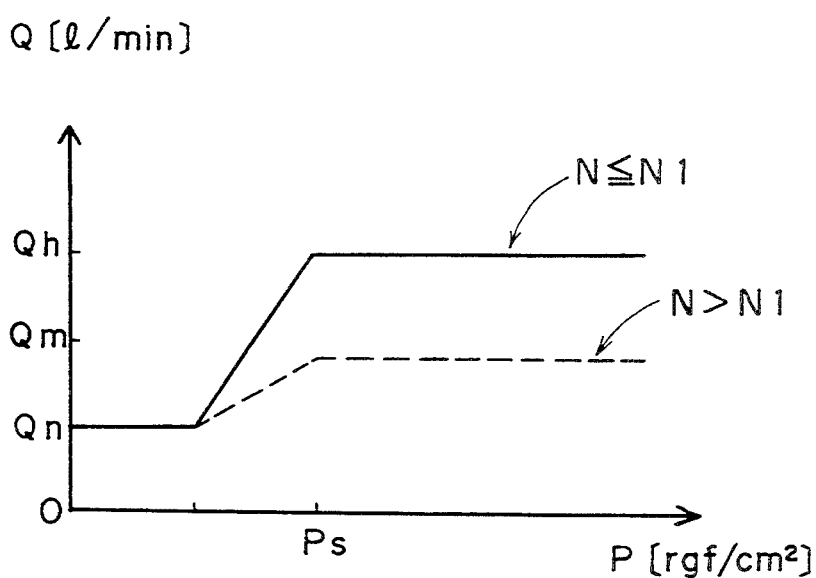
FIG. 9 is a graph showing the pressure-flow rate characteristic of the flow control valve of the power steering apparatus according to the third embodiment.

When the running speed of the engine reaches N2, the spool 61 reaches its left end, whereby the opening area of the additional orifice 63 becomes zero. In such condition, the pressurized fluid output from the pump 10 flows to the supply passage 50 only through the metering orifice 12, and the saturated flow rate of the pressurized fluid supplied to the supply passage 50 becomes Qm. The above-mentioned described characteristic is shown in FIGS. 8 and 9.

When the steering wheel HD is in its neutral position under the condition that the above-mentioned control is carried out, the drain valve 2 operates in a manner similar to the first embodiment, whereby the flow rate of the pressurized fluid is reduced to Qn. When the steering wheel HD is rotated, the drain operation of the drain valve 2 is stopped, whereby the flow rate is increased and controlled to have a speed responsive characteristic shown by the continuous line in FIG. 8.

Since the power steering apparatus according to this embodiment has a flow rate characteristic in which the flow rate of pressurized fluid changes in response to the running speed of the engine, the apparatus has an advantage to increase the stability of steering operation during high speed traveling, as well as the advantages which are the same as those in the first embodiment.

Third embodiment:

The power steering apparatus according to the first embodiment has a disadvantage that when the spool 21 of the drain valve 2 is locked due to small particles in the operation fluid under the condition that the spring chamber 15a of the flow control valve 11 is communicated with the reservoir 18, the bypass amount of pressurized fluid flowing to the reservoir 18 through the bypass passage 51 is kept large. This causes a problem that the pressure of the pressurized fluid supplied to the power cylinder 4 does not increase even when the steering wheel HD is rotated. Therefore, a sufficient assist force cannot be generated in such an abnormal condition.

A power steering apparatus according to this embodiment is further provided with a drain control valve to solve the above-mentioned problem.

In the following description, explanation on the portions same as those in the first embodiment will be omitted.

Figure 10:
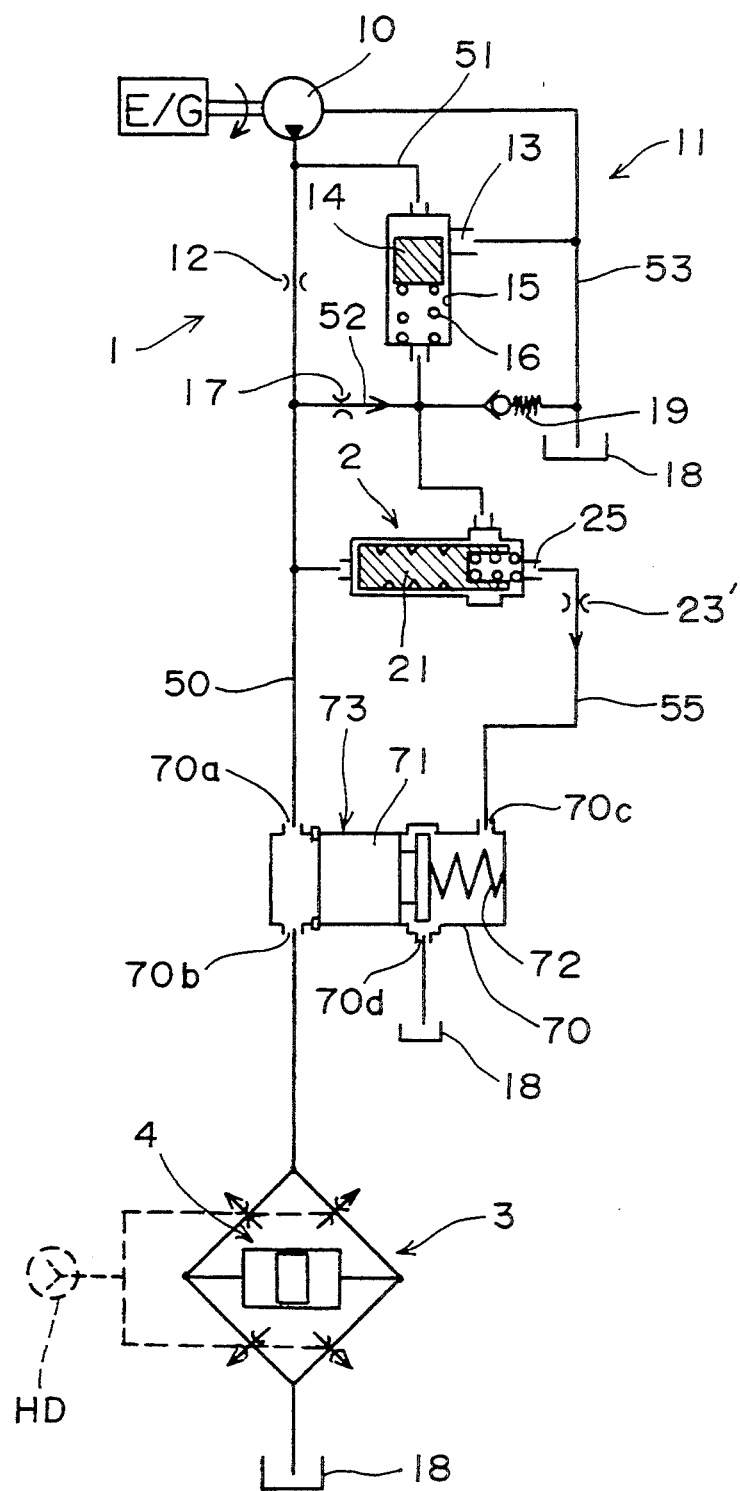
FIG. 10 is a schematic illustration showing a power steering apparatus according to a third embodiment of the present invention.

AS shown in FIG. 10, a drain control valve 73 is disposed to be located in the middle of the supply passage 50 and also located in the middle of the drain passage 55 between the drain valve 2 and the reservoir 18. Further, a second control orifice 23' is disposed in the middle of the passage between the drain valve 2 and the reservoir 18.

The drain control valve 73 is composed of a cylinder 70, a spool 71 received in the cylinder 70 and a spring 72. The cylinder 70 is formed at its first end with a first and second ports 70a and 70b which are connected to the supply passage 50. The housing is also provided at its right end with a third port 70c which is connected to the third port 25 of the drain valve 2, and at a middle position with a fourth port 70d which is connected to the reservoir 18. Therefore, the pressure of the fluid in the supply passage 50 at the downstream side of the metering orifice 12 acts on one end of the spool 71, while the pressure of the fluid in the drain passage 55 at the downstream side of the second control orifice 23' and a thrust force generated by the spring 72 act on the other end of the spool 71. The spool 71 controls the flow rate of the fluid flowing from the drain valve 2 to the reservoir 18.

The operation of this embodiment will be now described.

When the steering wheel HD is in its neutral position, the back pressure of the rotary valve 3 is low. In such case, the spool 21 of the drain valve 2 and the spool 71 of the drain control valve 73 are located at their retracted positions, as shown in FIG. 10, whereby the spring chamber 15a of the flow control valve 11 is communicated with the reservoir 18 via the drain valve 2, orifice 23' and the drain control valve 70, so that the pressure in the spring chamber 15a is low and almost equal to the pressure in the reservoir 18. The low pressure in the spring chamber 15a causes the spool 14 to move as viewed in FIG. 10, whereby the throttle control portion 13 of the bypass passage 51 is fully opened. In such condition, a major part of the pressurized fluid output from the pump 10 flows back to the pump 10 through the bypass passage 51, and the pressurized fluid is supplied to the rotary valve 3 at a rate Qn as shown by the broken line in FIG. 4. Since the major part of the pressurized fluid flows back to the pump 10 through the bypass passage 51 whose pressure loss is small, the energy loss produced at the pump 10 is small.

When the steering wheel HD is rotated, the back pressure of the servo valve 30 is increased. When the back pressure exceeds a predetermined pressure, the drain valve 2 operates to stop the flow of the pressurized fluid though the passage 55. In this condition, the pressure in the spring chamber 15a becomes equal to the pressure of the fluid at the downstream side of the metering orifice 12, whereby the opening of the throttle control portion 13 of the bypass passage 51 is reduced to supply pressure fluid to the rotary valve 3 at a flow rate Qh as shown by the continuous line in FIG. 4. Accordingly, a sufficient assist force is generated.

Figure 5:
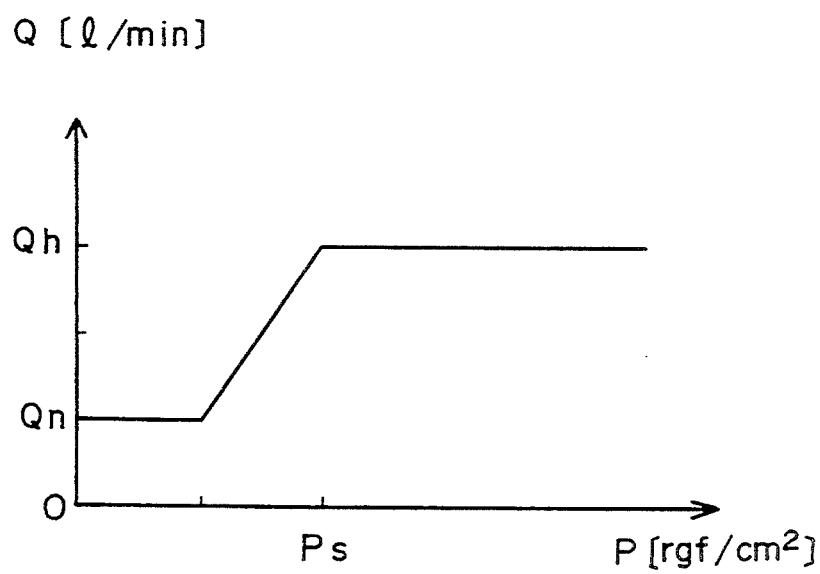
FIG. 5 is a graph showing the pressure-flow rate characteristic of the flow control valve of the power steering apparatus according to the first embodiment.

When the spool 21 of the drain valve 2 is locked due to small particles or the like under the condition that the spool 21 is located in its retracted position, the spool 21 does not move even when the back pressure of the rotary valve 3 increases. However, the spool 71 of the drain control valve 73 is moved in response to a pressure drop produced at the orifices 17 and 23', whereby the flow amount of the fluid flowing through the drain passage 55 is reduced. In such condition, the pressurized fluid flows at a rate q from the supply passage 50 to the reservoir 18 through the leading passage 52 and the drain passage 55, whereby the pressurized fluid is supplied to the rotary valve 3 at a flow rate which is smaller by the amount q compared to the flow rate Qh shown by the continuous lines in FIGS. 4 and 5. As a result, an assist force can be generated even though generated assist force becomes slightly smaller than that in the normal operating condition.

When the spool 21 of the drain valve 2 is locked due to small particles or the like under the condition that the spool 21 is located in its right moving end, the communication between the spring chamber 15a and the reservoir 18 is not established. In such condition, the spool 14 of the flow control valve 11 is moved in a normal manner in response to the pressure drop at the metering orifice 12. As a result, a sufficient assist force can be generated, even though the energy consumption by the pump 10 cannot be reduced.

Fourth embodiment:

In this embodiment, an electromagnetic drain valve 80 is used instead of the mechanical drain valve 2 which is used in the above embodiments. The electromagnetic drain valve 80 is controlled by an electric control unit 81 to which a speed sensor 82 is connected.

When the vehicle speed is slower than a predetermined speed V1, the electromagnetic drain valve 80 is controlled by the electric control unit 81 to completely close. When the vehicle speed reaches the speed V1, the opening of the drain valve 80 is gradually increased to fully open at a speed V2.

The operation of this embodiment will be now described. When the vehicle speed V is slower than the speed V1, the drain valve 80 is completely closed. In such condition, pressurized fluid is supplied to the rotary valve 3 at a predetermined maximum rate Q1, because the spring chamber 15a is not communicated with the reservoir 18.

Figure 12:
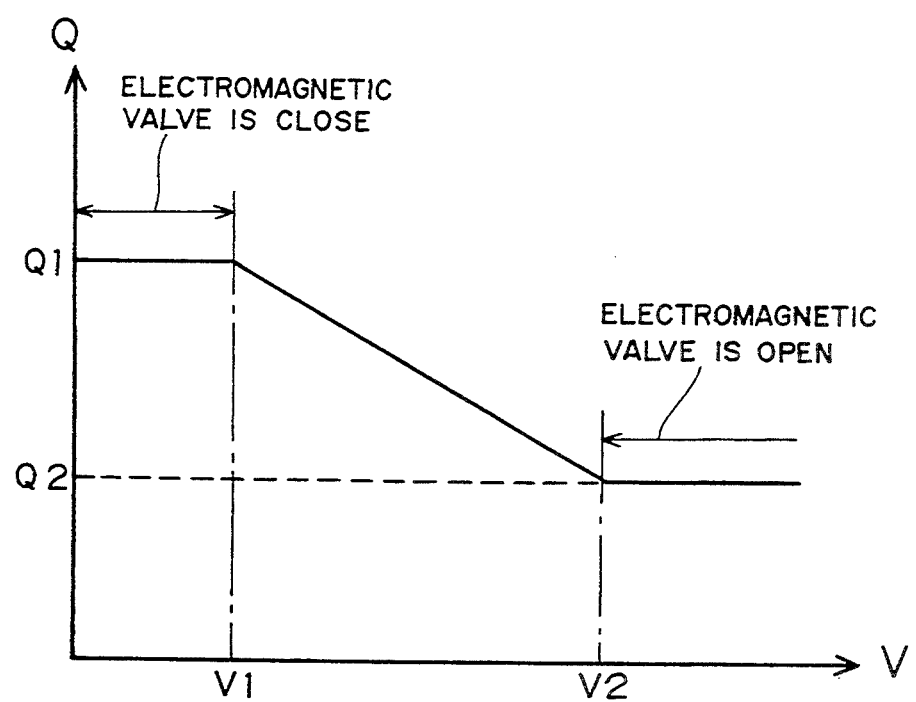
FIG. 12 is a graph showing the relationship between the traveling speed of a vehicle and the flow rate of pressurized fluid in the fourth embodiment.
Figure 13:
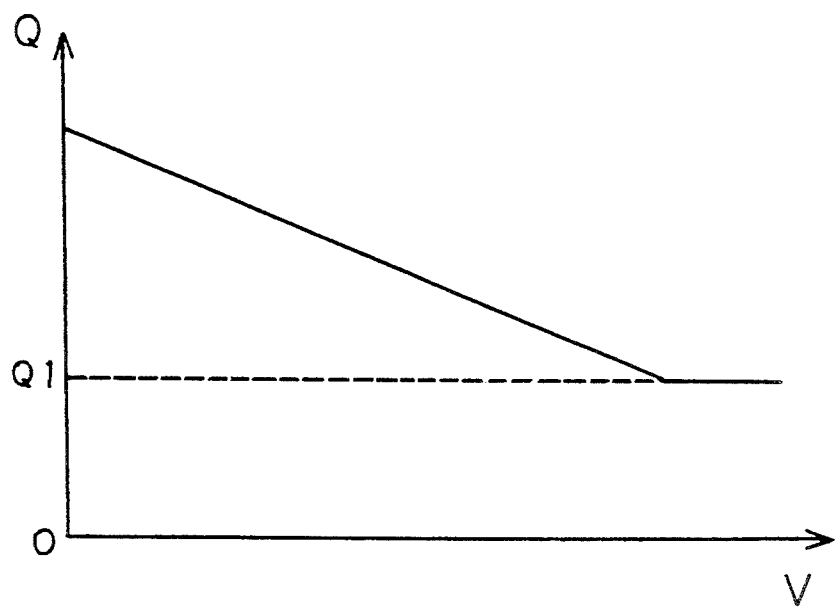
FIG. 13 is a graph showing the relationship between the vehicle speed and the flow rate of pressurized fluid in the modified embodiment of the fourth embodiment.
Figure 14:
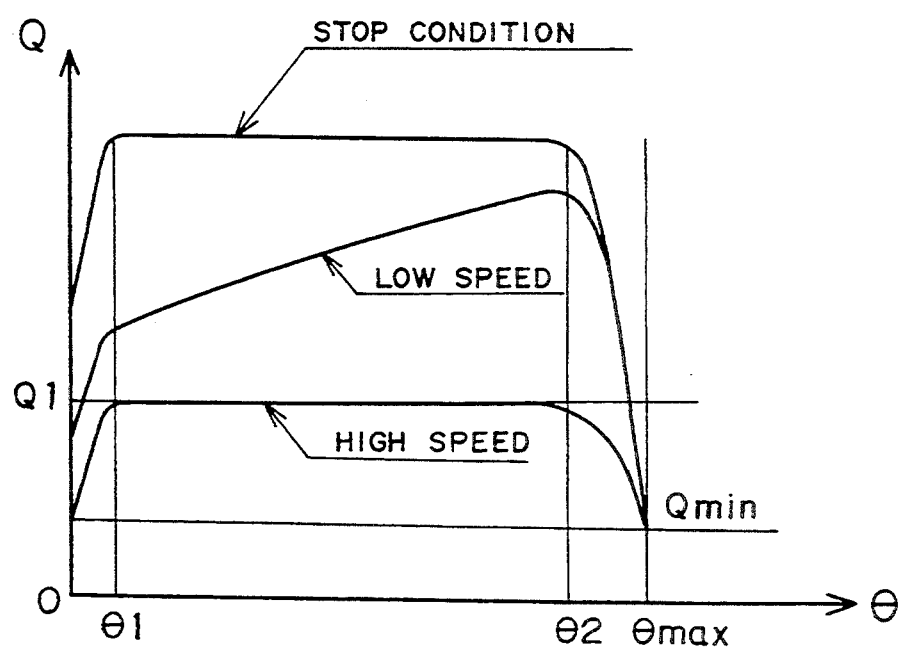
FIG. 14 is a graph showing the relationship between the rotational angle of the steering wheel and the flow rate of pressurized fluid in the modified embodiment.

When the vehicle speed V reaches the speed V1, the opening of the drain valve 80 is gradually increased. With this operation, the flow rate of the pressurized fluid flowing through the passage 55 increases, whereby the pressure in the spring chamber 15a decreases. This pressure decrease causes the spool 14 to move downwardly as viewed in FIG. 13, whereby the flow rate of the pressurized fluid flowing back to the pump 10 through the bypass passage 51 is increased. Therefore, the flow rate of the pressurized fluid supplied to the rotary valve 3 is gradually decreased, as shown in FIG. 12. When the opening of the drain valve 80 reaches the maximum, the flow rate of the pressurize fluid reaches its minimum value Q2.

As described above, the flow rate is controlled by the drain valve 80 to change in accordance with the vehicle speed.

When the back pressure of the rotary valve 3 is increased in response to the rotation of the steering wheel HD, the pressure difference between the pressure P1 at the upstream side of the first control orifice 17 and the pressure P2 at the downstream side of the first control orifice 17 becomes larger. In response to the increase of the pressure difference, the spool 71 of the drain control valve 73 is moved in the rightward direction to reduce the flow rate of the pressurized fluid flowing to the reservoir 18. This causes an increase of the pressure in the spring chamber 15a, resulting in an increase of the flow rate of the pressurized fluid supplied to the rotary valve 3. Therefore, the flow rate of the pressurized fluid supplied to the rotary valve 3 is maintained constant regardless of the change in the back pressure of the rotary valve 3.

In this embodiment, the passage 55 is connected to the reservoir 18. However, the passage 55 may be connected to the intake passage of the pump 10 to return the fluid to the pump 10.

Further, other types of sensors may be added to control the flow rate in accordance with other kinds of information such as the temperature of operating fluid, and the rotational angle of the steering wheel HD.

Figure 11:
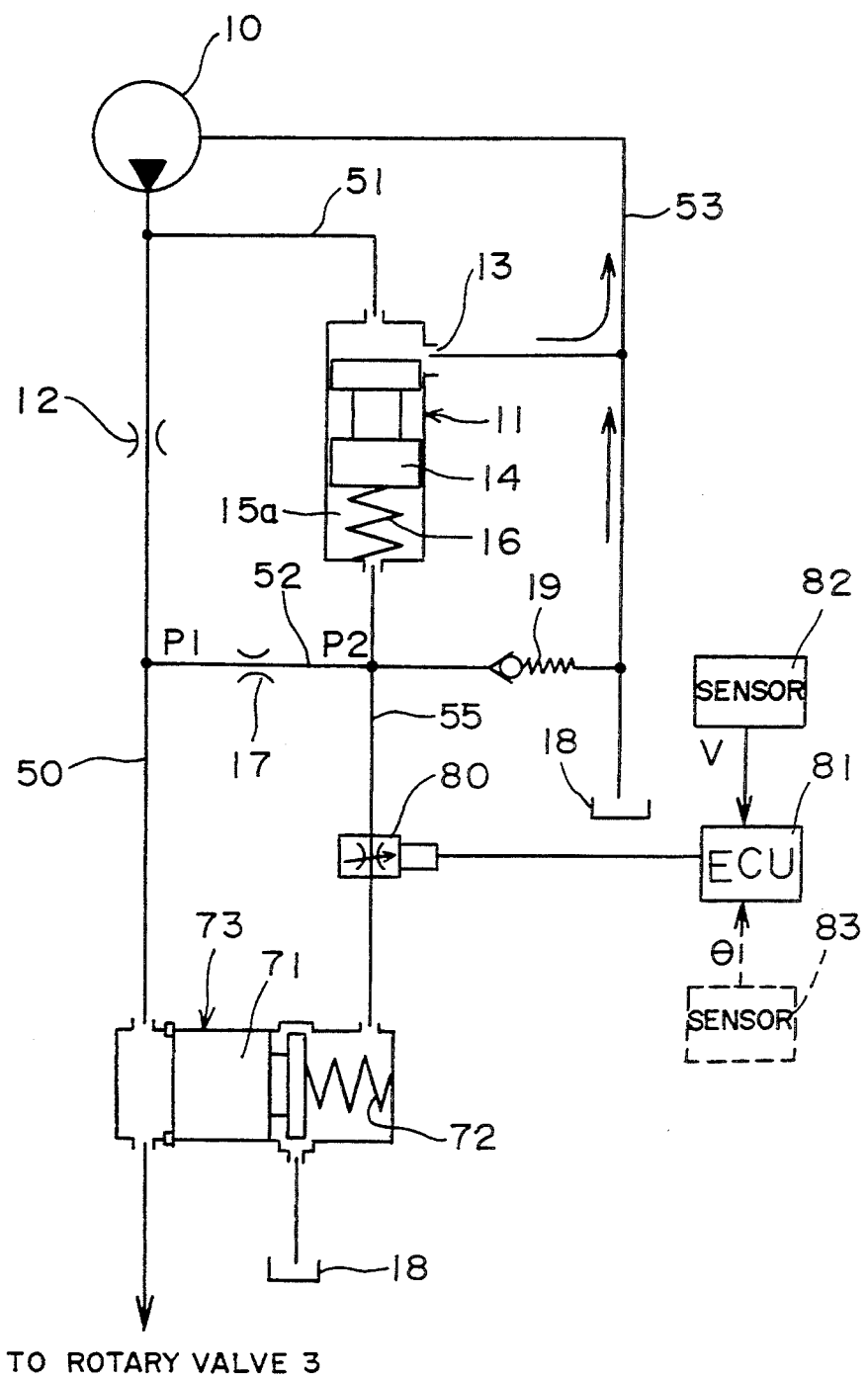
FIG. 11 is a schematic illustration showing a power steering apparatus according to a fourth embodiment of the present invention.

When an angle sensor 83 for detecting the rotational angle of the steering wheel HD is added to the embodiment shown in FIG. 11, the flow rate of pressurized fluid can be changed in accordance with the detected rotational angle and detected vehicle speed. In such modified embodiment, three flow rate characteristics may be prepared for stop condition, low speed travelling and high speed travelling, respectively. The flow rate of the pressurized fluid supplied to the rotary valve 3 is controlled according to these characteristics.

When the rotational angle $\theta$ approaches to a stroke end angle $\theta$max, namely reaches an angle $\theta 2$, the opening of the drain valve 80 is maximized. In this condition, a major part of the pressurized fluid flows back to the intake passage 53 through the bypass passage 51, whereby the flow rate of the pressurized fluid supplied to the rotary valve 3 is reduced to a minimum flow rate Qmin so as to substantially stop the generation of assist force. With this bypassing of the pressurized fluid, the internal pressure of the pump 10 is prevented from increasing, thereby reducing the energy consumption of the pump 10. Further, when the rotational angle of the steering wheel HD becomes smaller than $\theta 1$, the flow rate of the pressurized fluid is also.

Fifth embodiment:

The following fifth and sixth embodiments include an additional improvement on the rotary valve 3.

Figure 25:
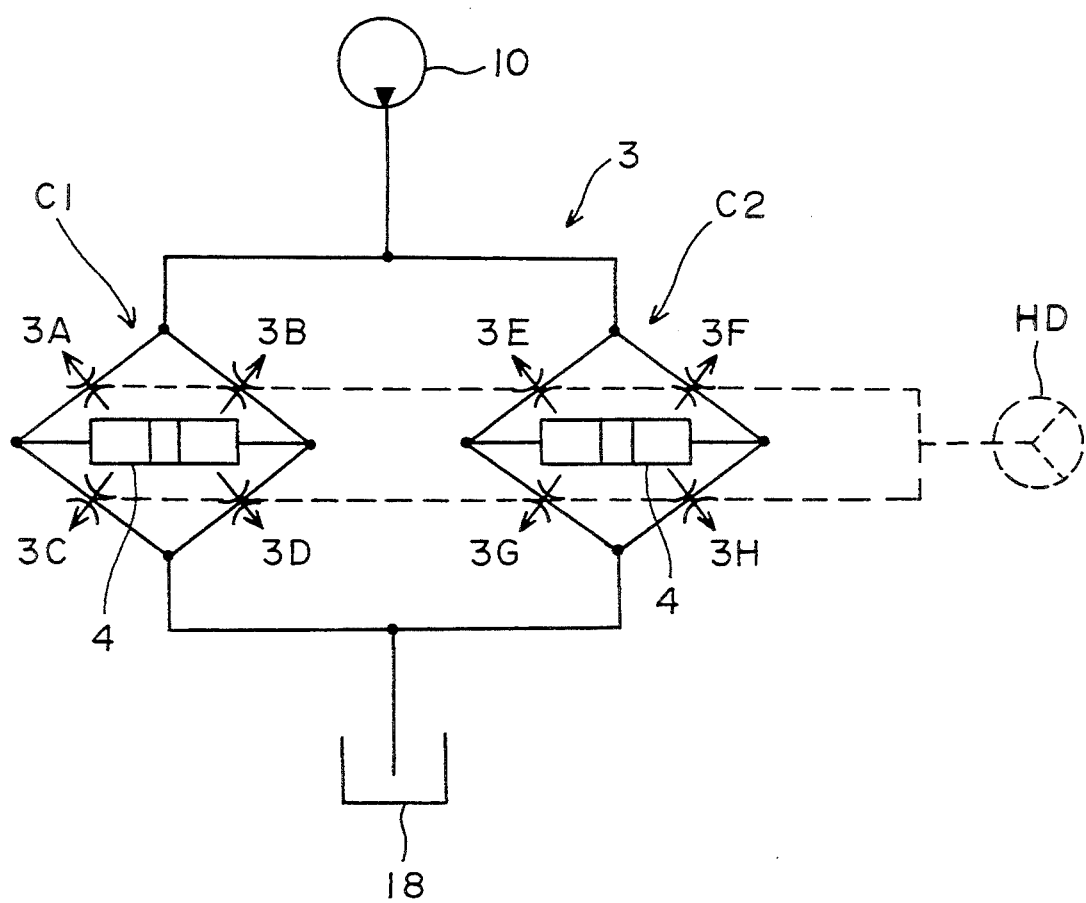
FIG. 25 is a schematic illustration showing a conventional rotary valve.

In a conventional power steering apparatus, a rotary valve 3 is composed of a pair of bridge circuits C1 and C2 which have variable orifice portions 3A-3D and 3E-3H, respectively, as shown in FIG. 25. When the steering wheel HD is rotated, the rotary valve 3 is operated so that the pressurized fluid output from the pump 10 is supplied to one of the chambers of the power cylinder 4, while the fluid is drained from the other of the chambers to the reservoir 18. Although the power cylinder 4 is arranged for each of bridge circuits C1 and C2, both cylinders are the same or are in common.

Figure 23:
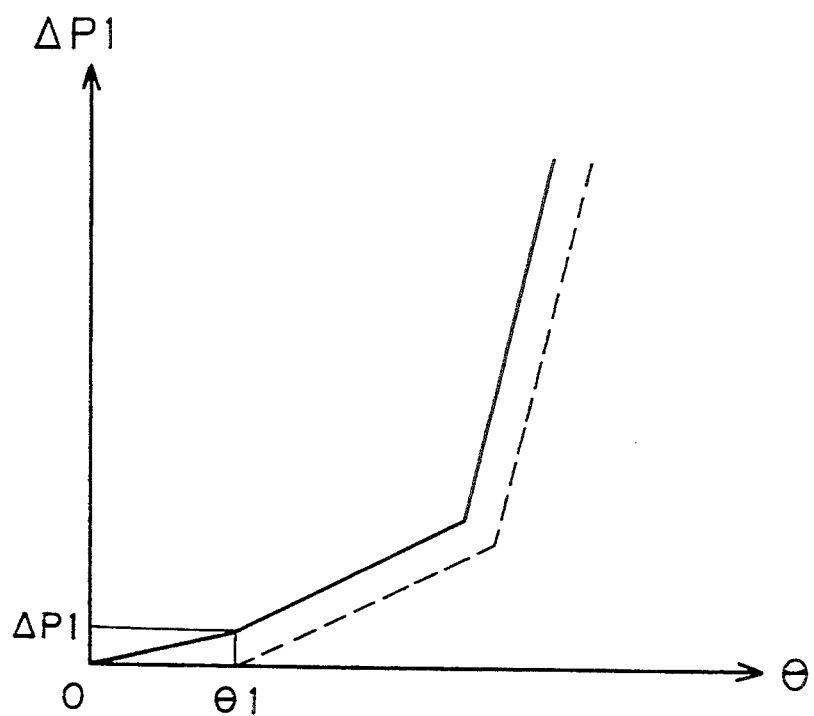
FIG. 23 is a graph showing the relationship between the relative rotational angle of the valve and the differential pressure in the power cylinder.
Figure 24:
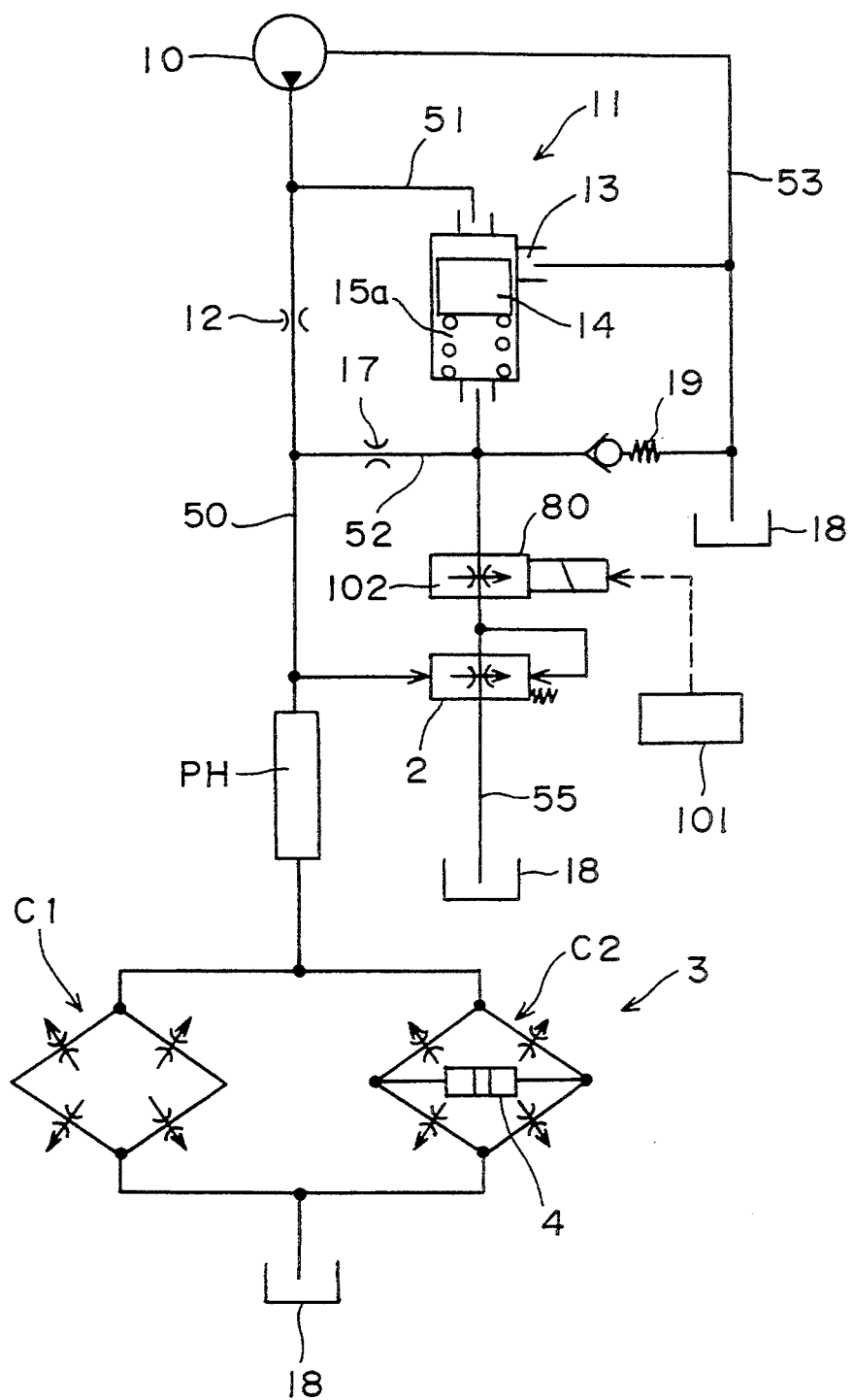
FIG. 24 is a schematic illustration showing a power steering apparatus according to a sixth embodiment of the present invention.

In such power steering apparatus, the rotary valve 3 is desired to have such a characteristic that the differential pressure in the power cylinder 4 becomes zero at rotational angle positions near the neutral position, or the rotational angle $\theta$ is less than $\theta 1$, whereby the generation of assist force is stopped. However, the conventional rotary valve has a characteristic that, even when the rotational angle of the steering wheel HD is located at a position near the neutral position or less than the angle $\theta 1$, the opening areas of the variable orifices 3A-3H are changed in response to the rotation of the steering wheel HD, whereby the differential pressure in the power cylinder 4 gradually increases, and becomes P1 when the rotational angle $\theta$ reaches $\theta 1$, as indicated by the continuous line in FIG. 23.

Therefore, the rotational angle at which the power assist is started becomes unclear, so that the driver cannot feel stability in the steering operation in an angular range near the neutral position.

A power steering apparatus according to this embodiment can solve the above problem and also attain the effects mentioned in the above embodiments.

Figure 15:
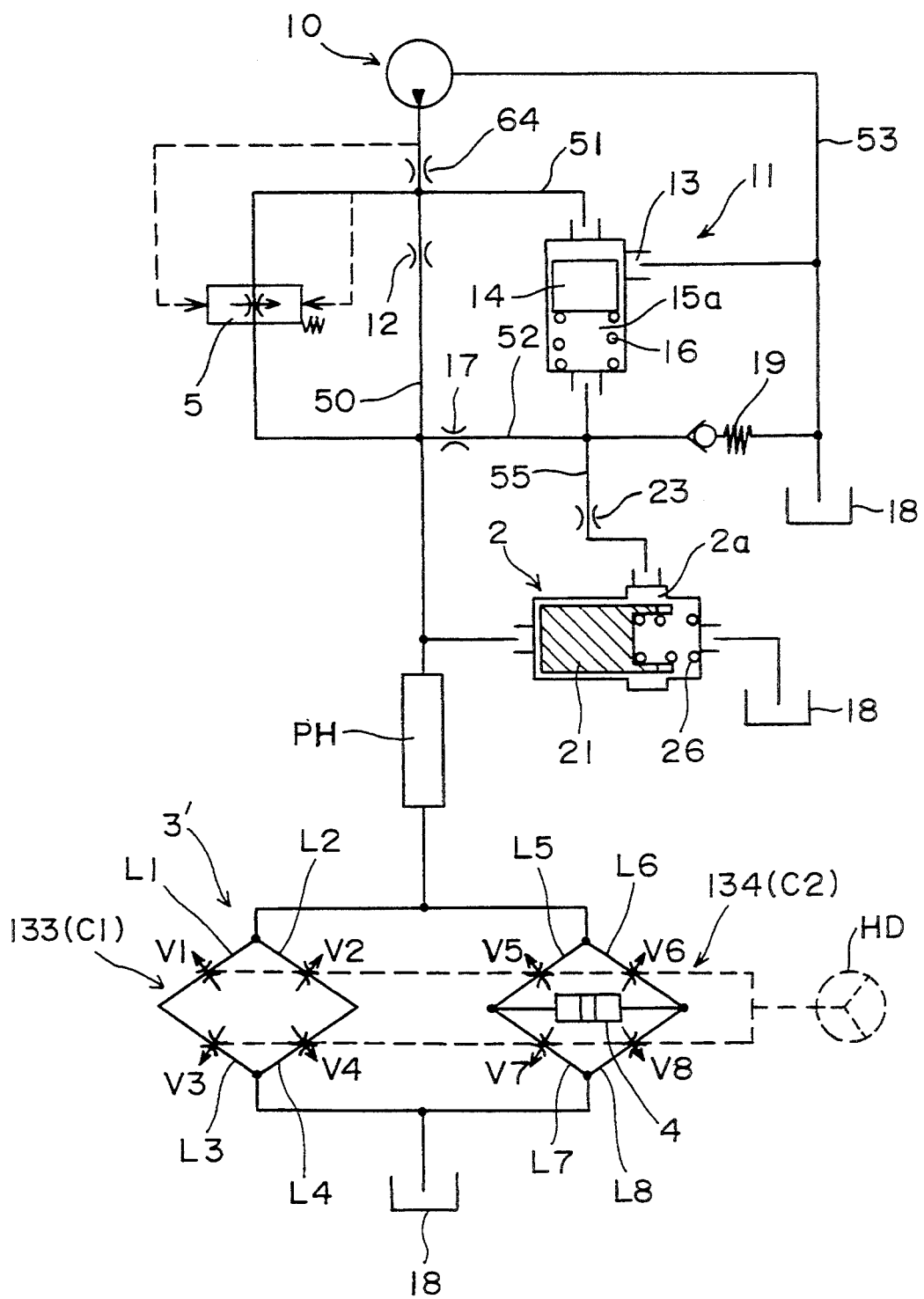
FIG. 15 is a schematic illustration showing a power steering apparatus according to a fifth embodiment of the present invention.

FIG. 15 shows the fifth embodiment which is similar to the second embodiment, but which has an improved rotary valve 3'.

Figure 16:
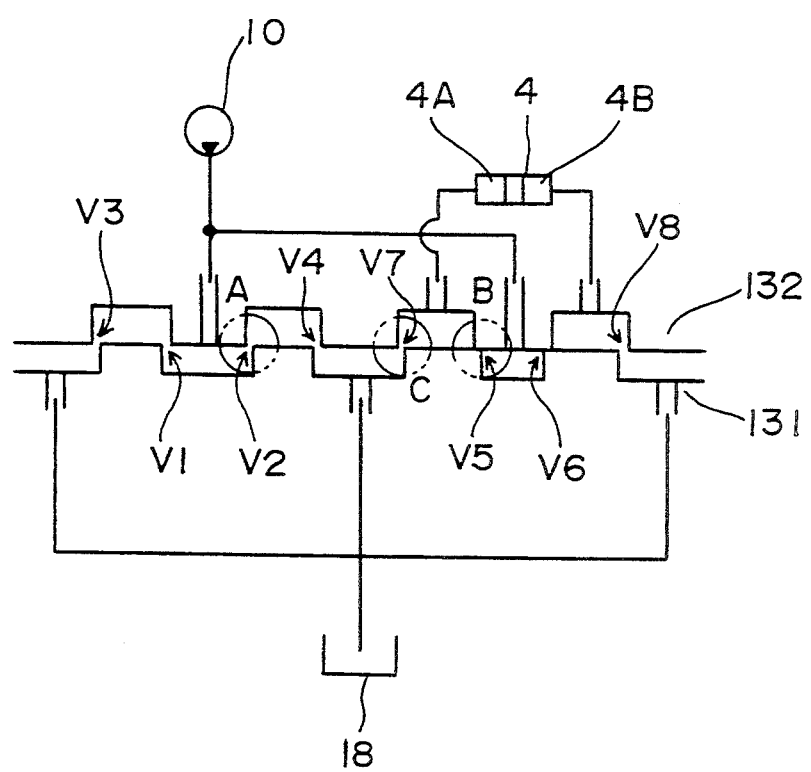
FIG. 16 is a development showing the structure of the rotary valve shown in FIG. 15.

The rotary valve 3' is mainly composed of a valve shaft 131 coupled with the steering wheel HD for rotation therewith, and a valve body 132 arranged to surround the valve shaft 131 in a coaxial relationship with the valve shaft 131, as shown in FIG. 16. The valve body 132 is mechanically coupled with a steering linkage to which assist force is applied by the power cylinder 4. The valve shaft 131 and valve body 132 are connected with each other through a torsion bar (not shown). Between the valve shaft 131 and valve body 132, a first control portion 133 and a second control portion 134 for controlling the flow of the pressurized fluid are alternately formed at intervals of 90 degrees.

Figure 19:
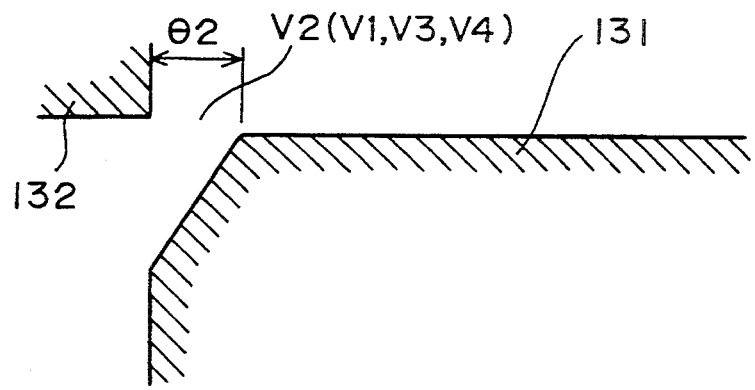
FIG. 19 is an enlarged view of the portion A of FIG. 16.
Figure 22:
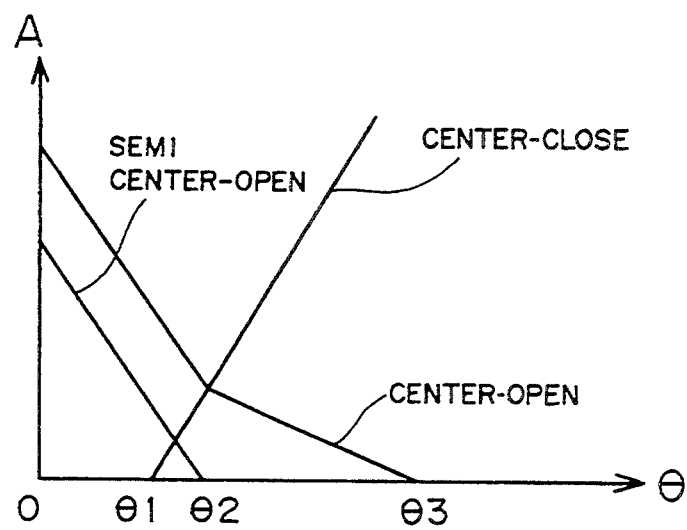
FIG. 22 is a graph showing the relationship between the relative rotational angle of the valve and the effective opening areas of the variable orifices of three types.

The first control portion 133 is composed of a first bridge circuit C1 having four fluid paths L1, L2, L3 and L4 which are connected to the pump 10 and the reservoir 18, and four variable orifices V1, V2, V3 and V4 disposed in the middle of the fluid paths L1, L2, L3 and L4, respectively. Actually, first ends of the fluid paths L1 and L2 (supply paths) are connected to a pressurized fluid receiving port of the rotary valve 3' while second ends of the fluid paths L1 and L2 are connected to first ends of the fluid paths L3 and L4 (drain paths), respectively. The second ends of the fluid paths L3 and L4 are connected to a drain port of the rotary valve 3'. Each of the variable orifices V1, V2, V3 and V4 is of a so-called semi center-open type which has an initial opening angle of $\theta 2$, as shown in FIG. 19, and which has such a characteristic that the opening area of the orifice changes in accordance with relative rotation (valve rotation) between the valve shaft 131 and valve body 132, as shown in FIG. 22.

Figure 20:
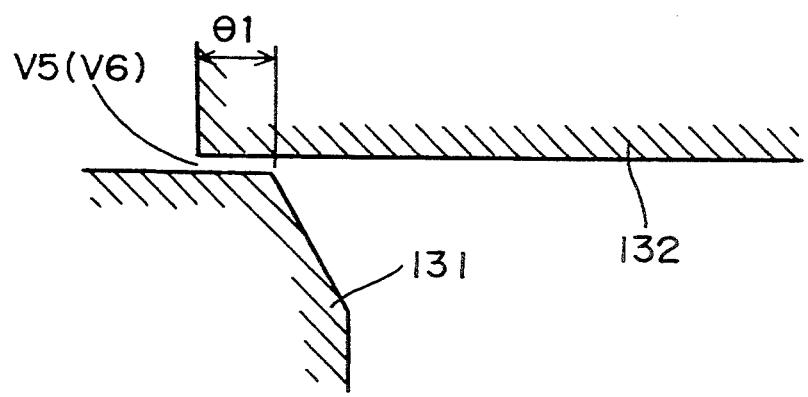
FIG. 20 is an enlarged view of the portion B of FIG. 16.
Figure 21:
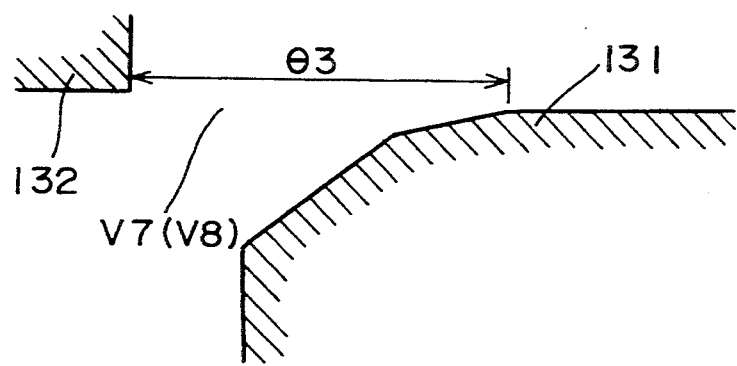
FIG. 21 is an enlarged view of the portion C of FIG. 16.

The second control portion 34 is connected to the first bridge circuit C1 in parallel, and is composed of a second bridge circuit C2 having four fluid paths L5, L6, L7 and L8 which are connected to the pump 10, the chambers 4A and 4B of the power cylinder 4 and the reservoir 18, and four variable orifices V5, V6, V7 and V8 disposed in the middle of the fluid paths L5, L6, L7 and L8, respectively. Actually, first ends of the fluid paths L5 and L6 (supply paths) are connected to the pressurized fluid receiving port of the rotary valve 3' while second ends of the fluid paths L5 and L6 are connected to the chambers of the power cylinder 4 and first ends of the fluid paths L7 and L8 (drain paths), respectively. The second ends of the fluid paths L7 and L8 are connected to the drain port of the rotary valve 3'. Each of the variable orifices V5 and V6 connected to the pump 10 is of a so-called center-close type, which closes when the valve shaft 131 is located at its neutral position with respect to the valve body 132, as shown in FIG. 20. Each of the variable orifices V7 and V8 connected to the reservoir 18 is of a so-called center-open type, which has an initial opening angle of $\theta 3$ when the valve shaft 131 is located at its neutral position with respect to the valve body 132, as shown in FIG. 21. The opening areas of these variable orifices V5, V6, V7 and V8 changes in accordance with relative rotation (valve rotation) between the valve shaft 131 and valve body 132, as shown in FIG. 22.

The operation of the power steering apparatus according to this embodiment will be now explained. The pressurized fluid output from the pump 10 is supplied to the first and second bridge circuits C1 and C2 via the first and second metering orifices 12 and 64. When the steering wheel HD is positioned in the neutral position, the variable orifices V5 and V6 of the second bridge C2 are closed. In such condition, the pressurized fluid is not supplied to the power cylinder 4, and the both chambers 4A and 4B of the power cylinder 4 are communicated with the reservoir 18 so that the internal pressures of the chambers 4A and 4B becomes low or zero. The pressurized fluid output from the pump 10 is drained to the reservoir 18 through the variable orifices V1, V2, V3 and V4 of the first bridge circuit C1.

Figure 17:
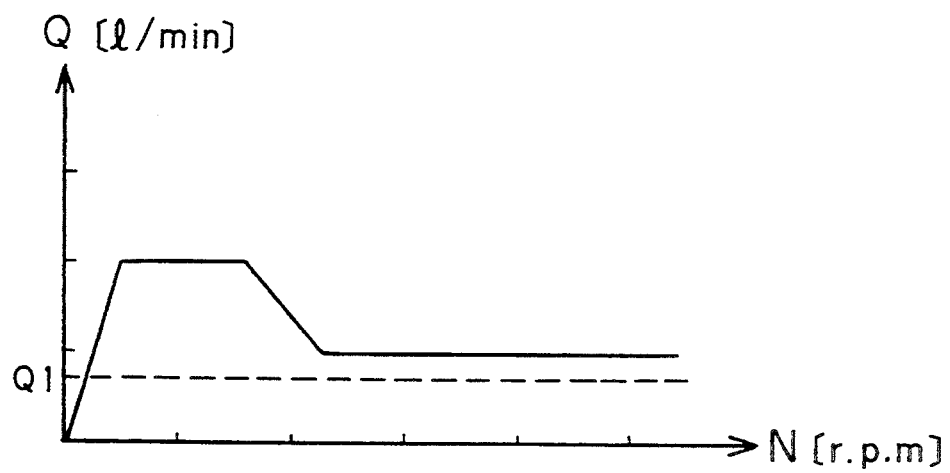
FIG. 17 is a graph showing the relationship between the running speed of an engine and the flow rate of pressurized fluid in the fifth embodiment.
Figure 18:
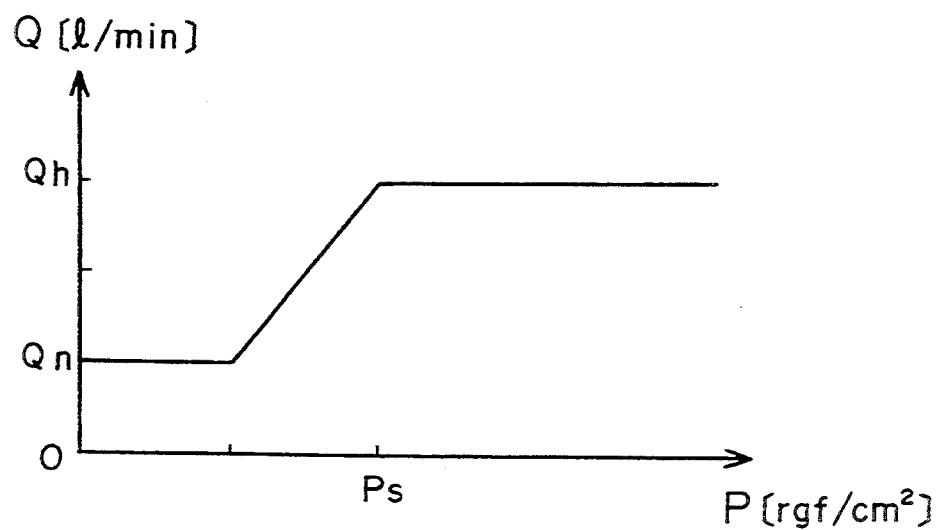
FIG. 18 is a graph showing the pressure-flow rate characteristic of the flow control valve of the power steering apparatus according to the fifth embodiment.

In such neutral condition, the drain valve 2 is fully opened because the back pressure of the rotary valve 3' is low. Therefore, the spring chamber 15a of the flow control valve 11 is communicated with the reservoir 18 so that the pressure in the spring chamber 15a is low. As a result, the spool 14 is moved in a downward direction to increase the flow rate of the pressurized fluid flowing back to the pump through the bypass passage 51, whereby the flow rate of the pressurized fluid supplied to the bridge circuits C1 and C2 is reduced to Q1 as shown by the broken line in FIG. 17.

When the valve shaft 131 rotates relative to the valve body 132, the opening areas of the variable orifices V1 and V4 of the first bridge circuit C1 increase while the opening areas of the remaining variable orifices V2 and V3 decreases, even if the relative rotation of the valve shaft 131 is a slight amount. With this operation, the back pressure of the rotary valve 3' gradually increases, and the spool 21 of the drain valve 2 is moved against the thrust force of the spring 26. When the back pressure reaches a predetermined presser, the flow rate of the pressurized fluid flowing through the drain valve 2 is gradually decreased, and finally becomes zero. This causes an increase of the pressure in the spring chamber 15a of the flow control valve 11, whereby the flow rate of the pressurized fluid supplied to the bridge circuits C1 and C2 is increased. The pump 10 has a pressure-flow rate characteristic similar to that of the pump in the second embodiment.

When the steering wheel HD is rotated, the back pressure of the rotary valve 3' gradually increases, as described above. However, the differential pressure produced between the chambers 4A and 4B of the power cylinder 4 is maintained to be zero until the valve rotational angle reaches θ1, because the variable orifices V5 and V6 of the second bridge circuit C2 are in closed condition until the valve rotational angle reaches θ1.

Accordingly, in the neutral blind zone in which the valve rotational angle is smaller than θ1, the differential pressure between the chambers 4A and 4B of the power cylinder 4 is prevented from increasing, thereby giving the driver a manual steering feel.

When the valve rotational angle exceeds 81, one of the variable orifices V5 and V6 starts to open, so that the pressure in one of the chambers 4A and 4B of the power cylinder 4 increases, which in turn increases the differential pressure between the chambers of the power cylinder 4. Simultaneously with this operation, the variable orifices V2 and V3 of the first bridge C1 starts to close. Accordingly, the pressurized fluid output from the pump 10 is supplied only to the second bridge circuit C2 whereby an assist force is generated when the rotation of the steering wheel HD is continued.

Accordingly, it is possible to reduce the flow rate of the pressurized fluid required for the power assist operation by half. This makes it possible to reduce the theoretical fluid supply amount of the pump 10, whereby the energy consumed by the pump 10 can be reduced.

The power steering apparatus in the above embodiment uses a speed responsive pump which changes the flow rate of pressurized fluid in accordance with the rotational speed of the pump. However, the present invention can be applied to other types of power steering apparatus in which the flow rate is changed in accordance with the vehicle speed, or maintained constant regardless of changes in the rotational speed of the pump or the vehicle speed.

Sixth embodiment:

A power steering apparatus according to this embodiment is similar to the fifth embodiment, but the apparatus is constructed such that the flow rate of the pressurized fluid supplied to the rotary valve 3' is changed in accordance with the vehicle speed. In this embodiment, a fixed displacement pump is used as the pump 10. Further, the electromagnetic valve 102 is disposed between the flow control valve 11 and the drain valve 2. The opening of the electromagnetic valve 102 is controlled in accordance with the vehicle speed detected by the speed sensor 101 so that the opening area of the electromagnetic valve 102 is increased in accordance with an increase of the vehicle speed.

Obviously, numerous modifications and variations of the present invention are possible in light of the above teachings. It is therefore to be understood that within the scope of the appended claims, the present invention may be practiced otherwise than as specifically described herein.

What is claimed is:

1. A power steering apparatus having a hydraulic pump for supplying a pressurized fluid, an assist force generation mechanism hydraulically connected to said pump through a supply passage to generate an assist force in response to rotation of a steering wheel, said assist force generation mechanism having a characteristic that a pressure upstream of said assist force generation mechanism increases when said steering wheel is rotated, wherein said power steering apparatus further comprises:

a metering orifice disposed in said supply passage;

a bypass passage connected to said supply passage upstream of said metering orifice for bypassing a part of the pressurized fluid from said supply passage to a reservoir or an intake port of said pump;

a flow control valve disposed in said bypass passage and having a movable spool which is urged by biassing means in a control chamber and is moved in response to a pressure difference across said metering orifice to control the flow rate of the pressurized fluid flowing through said bypass passage;

a drain passage connected between said control chamber and said reservoir; and a drain valve disposed in said drain passage for allowing the flow of the pressurized fluid from said control chamber to said reservoir through said drain passage when the pressure upstream of said assist force generation mechanism is low and for decreasing the flow of the pressurized fluid when the pressure upstream of said assist force generation mechanism increases.

2. A power steering apparatus according to claim 1, wherein said control chamber of said flow control valve is connected to said supply passage downstream of said metering orifice through a control orifice.

3. A power steering apparatus according to claim 2, wherein said drain valve comprises:
   means for defining a cylindrical chamber;
   a spool received in said cylindrical chamber to form a variable orifice at a first end of said spool for controlling the flow rate of the pressurized fluid flowing to said reservoir, and a pressure chamber at a second end of said spool;
   biassing means for biassing said spool in such a direction to open said variable orifice; and
   a port communicating with said supply passage downstream of said metering orifice to lead the pressure An said supply passage upstream of said assist force generation mechanism to said pressure chamber.

4. A power steering apparatus according to claim 2, wherein said assist force generation mechanism comprises:
   a power cylinder having a piston connected to a steering linkage and received in said power cylinder to form a pair of chambers therein; and
   a rotary valve operable upon rotation of said steering wheel to selectively deliver the pressurized fluid to one of said chambers in said power cylinder while permitting the other of said chambers in said power cylinder to communicate with said reservoir.

5. A power steering apparatus according to claim 1, wherein said control chamber of said flow control valve is connected to said supply passage downstream of said metering orifice through a control orifice, and wherein said power steering apparatus further comprises a drain control valve disposed in said drain passage at a position between said drain valve and said reservoir and responsive to a pressure drop at said control orifice to reduce the flow rate of the pressurized fluid flowing to said reservoir when the pressure upstream of said assist force generation mechanism increases.

6. A power steering apparatus according to claim 3, wherein said power steering apparatus further comprises:
   a drain control valve disposed in said drain passage at a position between said drain valve and said reservoir and responsive to the pressure upstream of said assist force generation mechanism to reduce the flow rate of the pressurized fluid flowing to said reservoir when the pressure upstream of said assist force generation mechanism increases.

7. A power steering apparatus having hydraulic pump for supplying a pressurized fluid, an assist force generation mechanism hydraulically connected to said pump through a supply passage to generate an assist forge in response to rotation of a steering wheel, said assist force generation mechanism having a characteristic that a pressure upstream of said assist force generation mechanism increases when said steering wheel is rotated, wherein said power steering apparatus further comprises:
   a metering orifice disposed in said supply passage,
   a bypass passage connected to said supply passage upstream of said metering orifice for bypassing a part of the pressurized fluid from said supply passage to a reservoir or an intake port of said pump;
   a flow control valve disposed in said bypass passage and having a movable spool which is urged by biassing means in a control chamber and is moved in response to a pressure difference across said metering orifice to control the flow rate of the pressurized fluid flowing through said bypass passage;
   a drain passage connected between said control chamber and said reservoir; and
   a drain valve disposed in said drain passage for allowing the flow of the pressurized fluid from said control chamber to said reservoir through said drain passage when the pressure upstream of said assist force generation mechanism is low, and for decreasing the flow of the pressurized fluid when the pressure upstream of said assist force generation mechanism increases,
   wherein said assist force generation mechanism comprises:
   a power cylinder having a piston connected to a steering linkage and received in said power cylinder to form a pair of chambers therein: and
   a rotary valve operable upon rotation of said steering wheel to selectively deliver the pressurized fluid to one of said chambers in said power cylinder while permitting the other of said chambers in said power cylinder to communicate with said reservoir, and
   wherein said power steering apparatus further comprises:
   a variable orifice mechanism disposed in said supply passage in parallel relationship with said metering orifice, said variable orifice mechanism comprising an additional orifice and a control spool for closing said additional orifice in response to an increase of the flow rate of the pressurized fluid discharged from said pump.

8. A power steering apparatus having a hydraulic pump for supplying a pressurized fluid, an assist force generation mechanism hydraulically connected to said pump through a supply passage to generate an assist force in response to rotation of a steering wheel, said assist force generation mechanism having a characteristic that a pressure upstream of said assist force generation mechanism increases when said steering wheel is rotated, wherein said power steering apparatus further comprises:
   a metering orifice disposed in said supply passage;
   a bypass passage connected to said supply passage upstream of said metering orifice for bypassing a part of the pressurized fluid from said supply passage to a reservoir or an intake port of said pump:
   a flow control valve disposed in said bypass passage and having a movable spool which is urged by biassing means in a control chamber and is moved in response to a pressure difference across said metering orifice to control the flow rate of the pressurized fluid flowing through said bypass passage;
   a drain passage connected between said control chamber and said reservoir; and
   a drain valve disposed in said drain passage for allowing the flow of the pressurized fluid from said control chamber to said reservoir through said drain passage when the pressure upstream of said assist force generation mechanism is low, and for decreasing the flow of the pressurized fluid when the pressure upstream of said assist force generation mechanism increases, wherein said assist force generation mechanism comprises:
- a power cylinder having a piston connected to a steering linkage and received in said power cylinder to form a pair of chambers therein; and
- a rotary valve operable upon rotation of said steering wheel to selectively deliver the pressurized fluid to one of said chambers in said power cylinder while permitting the other of said chambers in said power cylinder to communicate with said reservoir, and wherein said rotary valve comprises:
- a first control portion forming a first fluid bridge circuit having two supply paths connected to a pressurized fluid receiving port of said rotary valve and two drain paths connected to a drain port of said rotary valve, and variable orifices disposed in said four paths, respectively, so as to control the flow rate of the pressurized fluid flowing to said drain port through said first fluid bridge circuit; and
- a second control portion forming a second fluid bridge circuit having two supply paths connected to said pressurized fluid receiving port and said chambers of said cylinder and two drain paths connected to said chambers of said power cylinder and said drain port, and variable orifices disposed in said four paths, respectively, so as to control the flow rate of the pressurized fluid flowing to said chambers of said power cylinder, and
- wherein each of said variable orifices disposed in said supply paths and said drain paths of said first control portion is composed of a center-open type orifice which opens when said steering wheel is located at a neutral position, and each of said variable orifices disposed in said supply paths of said second control portion is composed of a center-close type orifice which closes when said steering wheel is located at the neutral position.

9. A power steering apparatus having a hydraulic pump for supplying a pressurized fluid, an assist force generation mechanism hydraulically connected to said pump through a supply passage to generate an assist force in response to rotation of a steering wheel, said assist force generation mechanism having a characteristic that a pressure upstream of said assist force generation mechanism increases when said steering wheel is rotated, wherein said power steering apparatus further comprises:
- a metering orifice disposed in said supply passage;
- a bypass passage connected to said supply passage upstream of said metering orifice for bypassing a part of the pressurized fluid from said supply passage to a reservoir or an intake port of said pump;
- a flow control valve disposed in said bypass passage and having a movable spool which is urged by biassing means in a control chamber communicating with said supply passage downstream of said metering orifice through a control orifice and is moved in response to a pressure difference across said metering orifice to control the flow rate of the pressurized fluid flowing through said bypass passage;
- a drain passage connected between said control chamber and said reservoir;
- an electromagnetic drain valve disposed in said drain passage, an opening of said electromagnetic drain valve being controlled in accordance with a driving condition; and
- a drain valve disposed in said drain passage at a position between said electromagnetic drain valve and said reservoir and responsive to the pressure upstream of said assist force generation mechanism to reduce the flow rate of the pressurized fluid flowing to said reservoir when the pressure upstream of said assist force generation mechanism increases.

10. A power steering apparatus having a hydraulic pump for supplying a pressurized fluid, an assist force generation mechanism hydraulically connected to said pump through a supply passage to generate an assist force in response to rotation of a steering wheel, said assist force generation mechanism having a characteristic that a pressure upstream of said assist force generation mechanism increases when said steering wheel is rotated, wherein said power steering apparatus further comprises:
- a metering orifice disposed in said supply passage:
- a bypass passage connected to said supply passage upstream of said metering orifice for bypassing a part of the pressurized fluid from said supply passage to a reservoir or an intake port of said pump;
- a flow control valve disposed in said bypass passage and having a movable spool which is urged by biassing means in a control chamber communicating with said supply passage downstream of said metering orifice through a control orifice and is moved in response to a pressure difference across said metering orifice to control the flow rate of the pressurized fluid flowing through said bypass passage;
- a drain passage connected between said control chamber add said reservoir:
- an electromagnetic drain valve disposed in said drain passage, an opening of said electromagnetic drain valve being controlled in accordance with a driving condition; and
- a drain valve disposed in said drain passage at a position between said electromagnetic drain valve and said reservoir and responsive to the pressure upstream of said assist force generation mechanism to reduce the flow rate of the pressurized fluid flowing to said reservoir when the pressure upstream of said assist force generation mechanism increases, and wherein said assist force generation mechanism comprises:
- a power cylinder having a piston connected to a steering linkage and received in said power cylinder to form a pair of chambers therein: and
- a rotary valve operable upon rotation of said steering wheel to selectively deliver the pressurized fluid to one of said chambers in said power cylinder while permitting the other of said chambers in said power cylinder to communicate with said reservoir, wherein said rotary valve comprises:
- a first control portion forming a first fluid bridge circuit having two supply paths connected to a pressurized fluid receiving port of said rotary valve and two drain paths connected to a drain port of said rotary valve, and variable orifices disposed in said four paths, respectively, so as to control the flow rate of the pressurized fluid flowing to said drain port through said first fluid bridge circuit; and a second control portion forming a second fluid bridge circuit having two supply paths for connecting said pressurized fluid receiving port and said chambers of said cylinder and two drain paths for connecting said chambers of said power cylinder and said drain port, and variable orifices disposed in said four paths, respectively, so as to control the flow rate of the pressurized fluid flowing to said chambers of said power cylinder, and wherein each of said variable orifices disposed in said supply paths and said drain paths of said first control portion is composed of a center-open type orifice which opens when said steering wheel is located at a neutral position, and each of said variable orifices disposed in said supply paths of said second control portion is composed of a center-close type orifice which closes when said steering wheel is located at the neutral position.

* * * * *